United States Patent
Liu et al.

(10) Patent No.: US 12,367,227 B2
(45) Date of Patent: Jul. 22, 2025

(54) METHOD AND APPARATUS FOR SEARCHING FOR POINT OF INFORMATION

(71) Applicant: HUAWEI TECHNOLOGIES CO., LTD., Guangdong (CN)

(72) Inventors: Wenjie Liu, Shenzhen (CN); Letian Feng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/541,155

(22) Filed: Dec. 15, 2023

(65) Prior Publication Data
US 2024/0111797 A1    Apr. 4, 2024

Related U.S. Application Data

(63) Continuation of application No. PCT/CN2022/097656, filed on Jun. 8, 2022.

(30) Foreign Application Priority Data

Jun. 17, 2021 (CN) .......................... 202110670104.3

(51) Int. Cl.
    *G06F 16/335* (2019.01)
    *G06F 16/29* (2019.01)
    (Continued)

(52) U.S. Cl.
    CPC ............ *G06F 16/335* (2019.01); *G06F 16/29* (2019.01); *G06F 16/334* (2019.01); *G06F 16/338* (2019.01)

(58) Field of Classification Search
    CPC ...... G06F 16/29; G06F 16/334; G06F 16/335; G06F 16/338; G06F 16/9535–9538
    See application file for complete search history.

(56) References Cited

U.S. PATENT DOCUMENTS

| | | | |
|---|---|---|---|
| 8,239,130 B1 * | 8/2012 | Upstill ............... | G01C 21/3679 701/410 |
| 2019/0179917 A1 * | 6/2019 | Agrawal ............. | G06F 16/9537 |

(Continued)

FOREIGN PATENT DOCUMENTS

| | | |
|---|---|---|
| CN | 102867031 A | 1/2013 |
| CN | 103942221 A | 7/2014 |

(Continued)

OTHER PUBLICATIONS

Shunkai Fu et al:"Ranking Factors in Devising Practical POI Search Model", Jun. 29, 2011 (Jun. 29, 2011), pp. 267-272, XP031911474.

(Continued)

*Primary Examiner* — James E Richardson

(57) ABSTRACT

A method and an apparatus for searching for a point of information (POI). According to the method, a client performs, based on a first search text entered by a user and first user data stored in the client, address extension on the first search text, to obtain a second search text that includes the first search text and includes first address information obtained based on the first user data. Because the first address information in the second search text is closely related to personal information of the user, it is highly probable that an address indicated by the first address information represents an address of a POI that the user expects to find. Therefore, it is highly probable that POI search results fed back by a server based on the second search text include a search result of the POI that the user is interested in or expects.

18 Claims, 9 Drawing Sheets

(51) Int. Cl.
*G06F 16/334* (2025.01)
*G06F 16/338* (2019.01)

(56) References Cited

U.S. PATENT DOCUMENTS

| | | | |
|---|---|---|---|
| 2021/0109958 A1* | 4/2021 | Behtash | G06F 18/214 |
| 2021/0319021 A1* | 10/2021 | Xie | G06N 20/00 |
| 2022/0335088 A1* | 10/2022 | Li | G06N 3/08 |
| 2022/0342936 A1* | 10/2022 | Li | G06F 16/9537 |

FOREIGN PATENT DOCUMENTS

| | | | | |
|---|---|---|---|---|
| CN | 104899200 A | | 9/2015 | |
| CN | 102483748 B | | 4/2016 | |
| KR | 20200129909 A | * | 11/2020 | ............. G06F 16/29 |
| WO | WO-2015075162 A1 | * | 5/2015 | ............. B60K 35/00 |

OTHER PUBLICATIONS

Extended European Search Report issued in EP22824101.4, dated Oct. 25, 2024, 8 pages.

\* cited by examiner (a)          (b)

220

S221: Filter, based on the first search text, the first user data to obtain a candidate POI text set S222: Determine, based on the first search text and the candidate POI text set, the second search text

S221: Filter, based on the first search text, the first user data to obtain a candidate POI text set S2221: Filter, based on effective time of a POI corresponding to each candidate POI text and/or popularity of the POI corresponding to each candidate POI text, the candidate POI text set to obtain an ultimate candidate POI text S2222: Determine, based on the first search text and the ultimate candidate POI text, the second search text

FIG. 6

METHOD AND APPARATUS FOR SEARCHING FOR POINT OF INFORMATION

CROSS-REFERENCE TO RELATED APPLICATIONS

This application is a continuation of International Application No. PCT/CN2022/097656, filed on Jun. 8, 2022, which claims priority to Chinese Patent Application No. 202110670104.3, filed on Jun. 17, 2021. The disclosures of the aforementioned applications are hereby incorporated by reference in their entireties.

TECHNICAL FIELD

This application relates to the field of search technologies, and more specifically, to a method and an apparatus for searching for a point of information.

BACKGROUND

Point of information (POI) search is a basic requirement of a user in the mobile Internet era, and has been incorporated into every aspect of life, such as daily transportation, tourism, and catering.

In a conventional technology, a POI search process is roughly as follows: A client sends a search text entered by a user to a server; and the server analyzes the search text, performs a search by using a user profile on the server to obtain search results matching the search text, ranks the search results, and feeds back the search results to the client. Because the user profile on the server cannot well indicate information related to the individual user, in some scenarios, the search results fed back by the server may fail to meet a personalized requirement of the user, causing poor user experience.

Therefore, a technology needs to be provided to meet the personalized requirement of the user as much as possible, to improve user experience.

SUMMARY

This application provides a method and an apparatus for searching for a POI, so that a search result conforming to a real search intention of a user may be output based on a search text entered by the user, to meet a personalized requirement of the user, thereby improving user experience.

According to a first aspect, a method of searching for a point of information is provided, including:
  obtaining a first search text entered by a user;
  determining, based on the first search text and first user data of a client, a second search text, where the first user data includes an address set, the second search text includes the first search text and first address information, the first address information indicates at least one address, a point of information (POI) corresponding to each address matches the first search text, and each address is related to an address in the address set;
  sending a search request to a server, where the search request includes the second search text; and
  receiving a plurality of POI search results sent by the server in response to the search request, where the plurality of POI search results include M POI search results matching the second search text, and M is an integer greater than or equal to 1.

The first search text is content related to the POI. For example, the first search text may be at least one of a name of the POI, a type of the POI, an address of the POI, or the like.

The first user data is local data stored in the client, and the first user data records a large amount of personal information of the user. For example, the first user data may include application data including local personal information, such as an SMS message or a memo.

The POI corresponding to each address represents a POI having the address; or an address of a POI is an address corresponding to the POI.

That a POI corresponding to each address matches the first search text may be understood as that, there is a correlation between related content of the POI corresponding to each address and the first search text. For example, that there is a correlation between related content of the POI corresponding to each address and the first search text may be represented by using a manner in which the related content of the POI is the same as or partially the same as content of the first search text, where the related content of the POI may be at least one of a type of the POI, a name of the POI, or an address of the POI.

Each address indicated by the first address information is related to an address in the address set, and there are the following two explanations.

First explanation: Each address indicated by the first address information is an address in the address set.

Second explanation: Each address indicated by the first address information is obtained based on an address that is in the address set and that corresponds to each address, where the address that is in the address set and that corresponds to each address is an address that is in the address set and that has a same region range as each address.

According to the method of searching for a point of information provided in this embodiment, based on the first search text entered by the user and the first user data stored in the client, the client performs address extension on the first search text to obtain the second search text that includes the first search text and includes the first address information obtained based on the first user data, and sends the second search text to the server by using the search request; and the server feeds back the plurality of POI search results based on the second search text. Because the second search text is a search text that is obtained based on the first user data of the client and includes the first address information, and the first address information is closely related to the user, it is highly probable that an address indicated by the first address information represents an address of a POI that the user expects to find. Therefore, it is highly probable that the POI search results fed back by the server based on the second search text include a search result of the POI that the user is interested in or expects, to conform to a real search intention of the user and meet a personalized requirement of the user, thereby improving both user experience and search performance. In addition, because the first user data is stored in the personal client of the user, a problem of user privacy disclosure is avoided as much as possible.

Optionally, the determining, based on the first search text and first user data of a client, a second search text includes:
  filtering, based on the first search text, the first user data to obtain a candidate POI text set, where each candidate POI text in the candidate POI text set matches the first search text and includes address information, and an address indicated by the address information in each candidate POI text is an address in the address set; and determining, based on the first search text and the candidate POI text set, the second search text, where each address indicated by the first address information is related to an address indicated by the address information in the candidate POI text set.

That the candidate POI text matches the first search text indicates that, the candidate POI text includes content that is the same as a part or all of the content of the first search text.

According to the method of searching for a point of information provided in this embodiment, based on the candidate POI text set that is obtained by filtering the first user data, address extension is performed on the first search text to obtain the second search text, so that a relatively valid address can be obtained to obtain the relatively valid second search text, thereby reducing a search cost of the server. In addition, when a quantity of the candidate POI texts is relatively small, the method provides high applicability and also can avoida relatively long processing delay that would otherwise be caused by a plurality of times of extra filtering by the client.

Optionally, the candidate POI text set includes a plurality of candidate POI texts; and the determining, based on the first search text and the candidate POI text set, the second search text includes:

filtering, based on an effective time of a POI corresponding to each candidate POI text and/or popularity of the POI corresponding to each candidate POI text, the candidate POI text set to obtain an ultimate candidate POI text; and determining, based on the first search text and the ultimate candidate POI text, the second search text, where each address indicated by the first address information is related to an address indicated by address information in the ultimate candidate POI text.

According to the method of searching for a point of information provided in this embodiment, the candidate POI text set that is obtained through filtering based on the first user data is filtered for a second time, so that the quantity of candidate POI texts can be further reduced and a more valid address can be obtained, to help reduce search texts of the server. In addition, the candidate POI text set is filtered for the second time by using the effective time of the POIs corresponding to the candidate POI texts, and time validity of the POIs is considered, so that an invalid POI can be effectively excluded; and the second filtering is performed by using the popularity of the POIs corresponding to the candidate POI texts, and the user's attention to the POIs is considered, so that POIs in which the user is not interested can be effectively ranked.

Optionally, the popularity of the POI corresponding to each candidate POI text includes: a frequency at which the POI appears on the client.

Optionally, the method further includes:

performing feature extraction on each POI search result, and determining at least one feature value corresponding to each POI search result, where the at least one feature value corresponding to each POI search result includes a quantity of historical clicks on a POI corresponding to each POI search result, the quantity of historical clicks is obtained based on software development kit (SDK) log data of the client, and the SDK log data records a click operation performed by the user on the POI on each APP; and ranking the plurality of POI search results based on the at least one feature value corresponding to each POI search result, to determine a recommended rank.

According to the method of searching for a point of information provided in this embodiment, for the plurality of POI search results fed back by the server, the client performs the feature extraction on each POI search result, to obtain the at least one feature value that includes the quantity of historical clicks on the POI corresponding to each POI search result; and ranks the plurality of POI search results based on the at least one feature value, to obtain the ultimate recommended rank. Because the quantity of historical clicks by the user on the POI can indicate a degree of the user's attention to the POI, a more personalized rank for the user can be obtained by ranking the plurality of POI search results based on the quantity of historical clicks on the POI corresponding to each POI search result. More importantly, compared with a way in which the server can obtain a quantity of clicks on the POI in a specific APP only, in this embodiment, all historical clicks by the user on the POI can be obtained by using the SDK log data that records the click operation performed on the POI on each APP, thereby implementing data sharing between the APPs and obtaining a more personalized rank for the user to meet a personalized requirement of the user. In addition, in the rank, it is highly probable that a POI search result expected by the user is a first POI search result in the plurality of POI search results, so that the user can quickly see the expected POI search result, thereby further improving user experience.

Optionally, the ranking the plurality of POI search results based on the at least one feature value corresponding to each POI search result, to determine a recommended rank includes:

ranking the plurality of POI search results based on the at least one feature value corresponding to each POI search result, to determine a client rank; and determining, based on the client rank and a server rank that is obtained by the server by ranking the plurality of POI search results, the recommended rank, where a first POI search result in the recommended rank is a first POI search result in the client rank, and a rank of POI search results in the recommended rank other than the first POI search result in the recommended rank is a rank of POI search results in the server rank other than the first POI search result in the recommended rank.

The first POI search result in the recommended rank is a POI search result in a first place in the recommended rank. Similarly, the first POI search result in the client rank is a POI search result in a first place in the client rank.

According to the method of searching for a point of information provided in this embodiment, because the quantity of historical clicks by the user on the POI is considered in the client rank, the first POI search result in the client rank is most likely a POI search result expected by the user. Therefore, the first POI search result in the client rank is used as the first POI search result in the recommended rank, so that the user can quickly see the expected POI search result and the recommended rank has a feature of user personality, to provide good user experience. In addition, because the server rank is related to a profile of the user and the server rank has a feature of commonality for a type of users, a rank of POI search results in the server rank other than the first POI search result in the client rank is used as the rank of the POI search results in the recommended rank other than the first POI search result in the recommended rank, to meet common experience of the user. Therefore, the recommended rank, which is obtained by combining the client rank and the server rank, has not only the feature of user personality but also the feature of user commonality;

and the recommended rank provides better comprehensive performance and more desirable user experience.

Optionally, the at least one feature value corresponding to each POI search result further includes at least one of the following:
- a feature value used to represent relevance between the second search text and the POI corresponding to each POI search result, or
- a distance between an address at which the client is currently located and the POI corresponding to each POI search result, or
- a feature value of a type of the POI corresponding to each POI search result.

Optionally, the client rank is obtained based on a learning-to-rank (LTR) model; and the method further includes:
updating the SDK log data based on a click operation performed by the user on at least one POI search result in the plurality of POI search results, to update the LTR model.

According to the method of searching for a point of information provided in this embodiment, the SDK log data is updated based on the click operation performed by the user on the at least one POI search result, to update the LTR model. In this way, the LTR model can learn a click behavior of the user in real time, and can better learn personal habits of the user more quickly and more effectively, to further meet the personalized requirement of the user, thereby further improving user experience.

Optionally, the search request further includes the first search text; and
the plurality of POI search results further include N POI search results matching the first search text other than the M POI search results, where N is an integer greater than or equal to 1.

According to the method of searching for a point of information provided in this embodiment, the first address information in the second search text, which is obtained by the client by performing address extension based on the first user data, is a possible search intention of the user and is kind of a guessing behavior. To avoid an intention guessing error, in this embodiment, the search request carries both the first search text entered by the user and the second search text obtained by performing the address extension, where the kept first search text indicates an original intention of the user, and the second search text indicates a real search intention of the user. In this way, the server can feed back all possible search results as much as possible, to comprehensively indicate all intentions of the user, thereby improving comprehensiveness and accuracy of the search results while implementing a personalized search, to further improve user experience.

Optionally, the second search text is an encrypted search text.

According to the method of searching for a point of information provided in this embodiment, because the second search text includes the first address information involving user privacy, to avoid disclosure of the user privacy in a data transmission process, the second search text is encrypted, so that the disclosure of the user privacy in the data transmission process can be avoided, thereby improving security.

According to a second aspect, an apparatus for searching for a point of information is provided, including a processing unit and a transceiver unit, where:
the processing unit is configured to obtain a first search text entered by a user;
the processing unit is further configured to determine, based on the first search text and first user data of the apparatus, a second search text, where the first user data includes an address set, the second search text includes the first search text and first address information, the first address information indicates at least one address, a point of information (POI) corresponding to each address matches the first search text, and each address is related to an address in the address set;
the transceiver unit is configured to send a search request to a server, where the search request includes the second search text; and
the transceiver unit is further configured to receive a plurality of POI search results sent by the server in response to the search request, where the plurality of POI search results include M POI search results matching the second search text, and M is an integer greater than or equal to 1.

Optionally, the processing unit is specifically configured to:
filter, based on the first search text, the first user data to obtain a candidate POI text set, where each candidate POI text in the candidate POI text set matches the first search text and includes address information, and an address indicated by the address information in each candidate POI text is an address in the address set; and
determine, based on the first search text and the candidate POI text set, the second search text, where each address indicated by the first address information is related to an address indicated by the address information in the candidate POI text set.

Optionally, the candidate POI text set includes a plurality of candidate POI texts; and the processing unit is specifically configured to:
filter, based on an effective time of a POI corresponding to each candidate POI text and/or popularity of the POI corresponding to each candidate POI text, the candidate POI text set to obtain an ultimate candidate POI text; and
determine, based on the first search text and the ultimate candidate POI text, the second search text, where each address indicated by the first address information is related to an address indicated by address information in the ultimate candidate POI text.

Optionally, the processing unit is further configured to:
perform feature extraction on each POI search result, and determine at least one feature value corresponding to each POI search result, where the at least one feature value corresponding to each POI search result includes a quantity of historical clicks on a POI corresponding to each POI search result, the quantity of historical clicks is obtained based on software development kit (SDK) log data of the apparatus, and the SDK log data records a click operation performed by the user on the POI on each APP; and
rank the plurality of POI search results based on the at least one feature value corresponding to each POI search result, to determine a recommended rank.

Optionally, the processing unit is specifically configured to:
rank the plurality of POI search results based on the at least one feature value corresponding to each POI search result, to determine a client rank; and
determine, based on the client rank and a server rank that is obtained by the server by ranking the plurality of POI search results, the recommended rank, where a first POI search result in the recommended rank is a first POI search result in the client rank, and a rank of POI search results in the recommended rank other than the first POI search result in the recommended rank is a rank of POI search results in the server rank other than the first POI search result in the recommended rank.

Optionally, the at least one feature value corresponding to each POI search result further includes at least one of the following:
  a feature value used to represent relevance between the second search text and the POI corresponding to each POI search result, or
  a distance between an address at which the apparatus is currently located and the POI corresponding to each POI search result, or
  a feature value of a type of the POI corresponding to each POI search result.

Optionally, the client rank is obtained based on a learning-to-rank (LTR) model; and the processing unit is further configured to:
  update the SDK log data based on a click operation performed by the user on at least one POI search result in the plurality of POI search results, to update the LTR model.

Optionally, the search request further includes the first search text; and
  the plurality of POI search results further include N POI search results matching the first search text other than the M POI search results, where N is an integer greater than or equal to 1.

Optionally, the second search text is an encrypted search text.

According to a third aspect, an apparatus for searching for a point of information is provided. The apparatus is configured to perform the method provided in the first aspect. Specifically, the apparatus may include modules configured to execute any one of the possible implementations of the first aspect.

According to a fourth aspect, an apparatus for searching for a point of information is provided, including a processor. The processor is coupled to a memory, and may be configured to execute instructions in the memory, to implement the method according to any one of the possible implementations of the first aspect. Optionally, the apparatus further includes the memory. Optionally, the apparatus further includes a communication interface, and the processor is coupled to the communication interface.

According to a fifth aspect, a computer-readable storage medium is provided. The computer-readable storage medium stores a computer program. When the computer program is executed by an apparatus, the apparatus is enabled to implement the method according to any one of the first aspect or the possible implementations of the first aspect.

According to a sixth aspect, a computer program product including instructions is provided. When the instructions are executed by a computer, an apparatus is enabled to implement the method according to any one of the possible implementations of the first aspect.

According to a seventh aspect, a chip is provided. The chip includes an input interface, an output interface, a processor, and a memory. The input interface, the output interface, the processor, and the memory are connected to each other by using an internal connection path. The processor is configured to execute code in the memory. When the code is executed, the processor is configured to perform the method according to any one of the possible implementations of the first aspect.

BRIEF DESCRIPTION OF DRAWINGS

FIG. 5 is an exemplary schematic flowchart of determining, by a client based on a first search text and first user data, a second search text according to an embodiment of this application;

FIG. 6 is another exemplary schematic flowchart of determining, by a client based on a first search text and first user data, a second search text according to an embodiment of this application;

DESCRIPTION OF EMBODIMENTS

Figure 1:
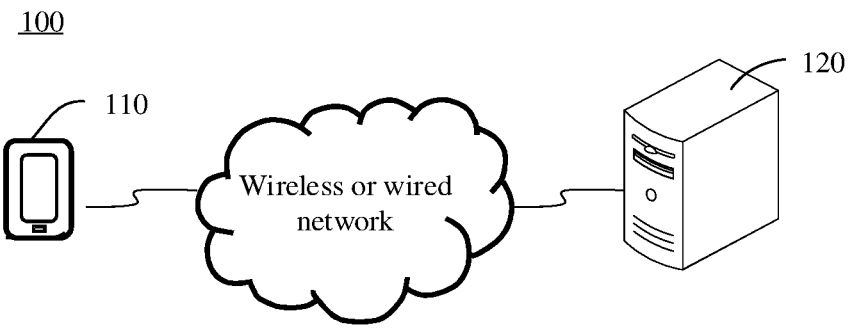
FIG. 1 is a schematic diagram of an exemplary search system according to an embodiment of this application.

The following describes the technical solutions of this application with reference to the accompanying drawings.

In an existing POI search, a client sends a search text entered by a user to a server; and the server analyzes the search text, performs a search by using a user profile on the server to obtain search results matching the search text, ranks the search results, and then feeds back the search results to the client. The user profile is a labelled profile abstracted based on information, such as demographic information, social relationships, preferences and habits, and consumption behaviors of the user. For example, a user label of a person is a foodie, and then the server preferentially feeds back restaurant-type POIs during the search and ranking. Because the user profile represents characteristics of a type of people and cannot well indicate information related to the individual user, in some scenarios, the search results fed back by the server do not meet the personalized requirements of the user, thereby affecting user experience.

For example, in a scenario, the user is resident in Shenzhen, needs to go to Hangzhou for a business trip, and makes a reservation for an Atour Hotel on the Jiangling Road in the Binjiang District of Hangzhou. After receiving a hotel reservation success SMS message sent by a platform, the user wants to invoke a map to search for the reserved Atour Hotel in Hangzhou before departure. In a search interface of the map, the user enters "Atour". Because the user is currently located in Shenzhen, all search results displayed on the search interface are Atour Hotels in Shenzhen. Actually, the user expects that the search results returned by the server include the Atour Hotel on the Jiangling Road in the Binjiang District of Hangzhou. Therefore, the foregoing search results do not meet the actual requirement of the user and do not meet the personalized requirement of the user, causing poor user experience.

Therefore, embodiments of this application provide an example method of searching for a POI. A client performs, based on a first search text entered by a user and first user data stored in the client, address extension on the first search text to obtain a second search text after the extension, where the second search text includes address information obtained based on the first user data; and sends the second search text to a server by using a search request. The server feeds back search results based on the second search text. Because the second search text is a search text that is obtained based on the first user data of the client and includes the address information, and the address information is closely related to personal information of the user, it is highly probable that an address indicated by the address information represents an address of a POI that the user expects to find. Therefore, it is highly probable that the search results obtained based on the second search text may include a search result conforming to a real search intention of the user, to conform to an actual requirement of the user and meet a personalized requirement of the user, thereby improving user experience. In addition, because the user data is stored in the client, this avoids a problem that the user's privacy cannot be protected due to storage of the user data in the server.

It needs to be noted that, this embodiment can be used in any possible search field, for example, can be used in a map search field.

FIG. 1 is a schematic diagram of an example search system 100 according to an embodiment of this application. The search system 100 includes a client 110 and a server 120. The client 110 may be connected to the server 120 by using a wired or wireless network.

The client 110 has functions such as requesting to search for data, storing data, and processing data. For example, the client 110 may be a device that can directly interact with a user, such as a mobile phone, a tablet computer, an e-reader, a personal computer, a vehicle-mounted device, a wearable device, or a smart home device.

In this embodiment, the client 110 stores user data, and the user data includes two categories of data. A first category of data is denoted as first user data, and the first user data includes local personal information, such as an SMS message or a memo. A second category of data may be understood as behavior data of the user, and may be software development kit (SDK) log data, which mainly records usage of applications (APP) operated by the user on the client, including but not limited to: a time point at which the user opens a specific APP, a time point at which the APP is closed, a time point at which the APP crashes, a frequency at which the user clicks the APP, a frequency at which the user clicks some content of the APP, or the like.

In some embodiments, the client 110 may perform, based on the first user data, address extension on a first search text entered by the user, to obtain a second search text that includes address information, so that the server feeds back search results based on the second search text.

In some other embodiments, the client 110 may re-rank, with reference to the SDK log data, the search results fed back by the server, to obtain search results in a more accurate rank to meet an actual requirement of the user.

The server 120 has a data search function, a data storage function, and a function of feeding back search results based on a search request sent from the client 110. The server 120 may be a device configured to search for data, for example, a computing device or a server. For example, the server 120 may be a server in a remote server cluster running in a data center in each region.

The following describes in detail, with reference to FIG. 2 to FIG. 9, the method of searching for a POI according to embodiments of this application.

Figure 2:
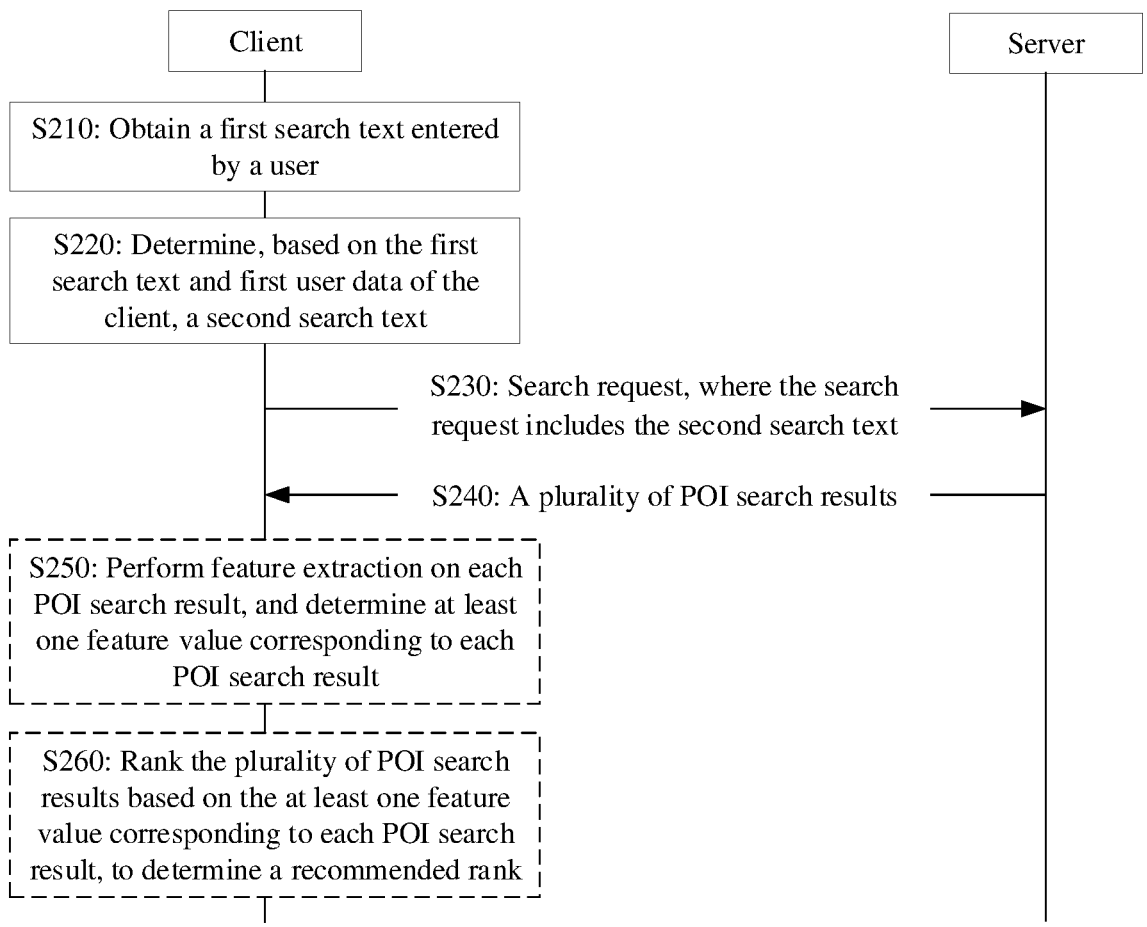
FIG. 2 is a schematic flowchart of an exemplary method of searching for a POI according to an embodiment of this application.

FIG. 2 is a schematic flowchart of an example method 200 of searching for a POI according to an embodiment of this application.

In S210, a client obtains a first search text entered by a user.

The first search text is content related to the POI. For example, the first search text may be at least one of a name of the POI, a type of the POI, an address of the POI, or the like. The Atour Hotel on the Jiangling Road in the Binjiang District of Hangzhou is used as an example of the POI. The name of the POI is Atour. The type of the POI is a hotel. The address of the POI is the Jiangling Road in the Binjiang District of Hangzhou, or the Binjiang District of Hangzhou, or Hangzhou.

Figure 3:
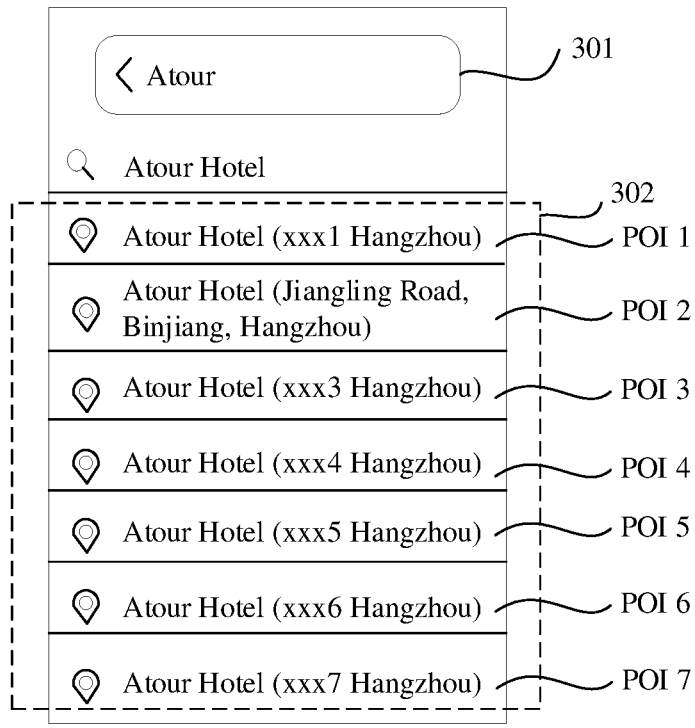
FIG. 3 is an exemplary GUI of a map according to an embodiment of this application.

In this step, for example, the user may enter the first search text in a search box of an APP on the client. For example, FIG. 3 shows a graphical user interface (GUI) of a map. The GUI includes a search box 301, and the user may enter the first search text (for example, Atour) in the search box 301 manually or by voice.

In S220, the client determines, based on the first search text and first user data of the client, a second search text, where the first user data includes an address set, the second search text includes the first search text and first address information, the first address information indicates at least one address, a point of information (POI) corresponding to each address matches the first search text, and each address is related to an address in the address set.

In this step, an objective is to perform, based on the first search text and the first user data, address extension on the first search text, to obtain the second search text that includes the first address information and includes the first search text, to figure out a real search intention of the user as accurately as possible.

The first user data is local data stored in the client, and the first user data records a large amount of personal information of the user. A plurality of POI texts used to represent POIs may be obtained based on the first user data. Each POI text corresponds to one POI, and each POI text includes at least one of the following items of the corresponding POI: source information (for example, an SMS message or a memo) indicating a source of the POI, name information (for example, Atour or Shangri-La) indicating the POI, type information (for example, a hotel, a restaurant, a scenic spot, or a shopping mall) indicating a type of the POI, address information (for example, Jiangling Road, Binjiang, Hangzhou) indicating an address of the POI, time information indicating an effective time of the POI, and popularity information indicating popularity of the POI. The address information of the POI may represent an address. The effective time of the POI may be represented by using a start time (start_time) and an end time (end_time). The popularity information of the POI may indicate the popularity of the POI to which the user pays attention. For example, the popularity of the POI may be represented by using a frequency at which the POI appears on the client.

For ease of description, a set formed by the plurality of POI texts is denoted as a POI text set.

In the POI text set, probably some POI texts include address information, and the other POI texts do not include address information, or probably all POI texts include address information. Therefore, each POI text in at least some of the POI texts in the POI text set includes one piece of address information, and addresses indicated by all the address information in the at least some of the POI texts may form addresses in the address set, where the at least some of the POI texts include a part or all of the POI texts in the POI text set. For example, the POI text set includes five POI texts, where three POI texts include address information, and the other two POI texts do not include address information. Therefore, some POI texts in the POI text set include address information, all the address information of the three POI texts is three pieces of address information, and addresses indicated by the three pieces of address information form the addresses in the address set. For another example, the POI text set includes eight POI texts, and each POI text includes address information. Therefore, all the POI texts in the POI text set include address information, and there are a total of eight pieces of address information. Addresses indicated by the eight pieces of address information form the addresses in the address set.

For example, the first user data may include application data including local personal information, such as an SMS message or a memo. For example, a memo of the user records a recent trip arrangement of the user, and the trip arrangement is data in the first user data. For another example, content recorded in an SMS message about the user's reservation of a hotel, a vehicle, or the like during a trip is data in the first user data.

In some embodiments, the client may filter and extract the first user data to obtain a plurality of POI texts.

In an example, when filtering the first user data, the client may filter out some useless information irrelevant to the POI by using a keyword, a mobile number segment, or the like. For example, bank notification information and advertisement information are filtered out from an SMS message.

In an example, the client may extract the filtered first user data by using a natural language processing (NLP) technology, to obtain the plurality of POI texts.

Figure 4:
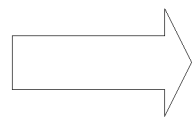
FIG. 4 is an exemplary schematic diagram of converting a hotel reservation message in an SMS message into a semi-structured POI text according to an embodiment of this application.

To facilitate data processing, the client may use semi-structured data to represent a POI text, and the POI text represented by using the semi-structured data may be referred to as a semi-structured POI text. FIG. 4 is a schematic diagram of converting a hotel reservation message in an SMS message into a semi-structured POI text according to an embodiment of this application. In FIG. 4, (a) is content of the SMS message, and (b) is the semi-structured POI text, where source information indicates that a source of the text is the SMS message, name information indicates that a name of a POI is "Atour Hotel", type information indicates that a type of the POI is "hotel", address information indicates that a detailed address of the POI is "Binjiang, Hangzhou", time information includes start_time and end_time, start_time indicates that a start time of an effective time is "2021.4.3", end_time indicates that an end time of the effective time is "2021.4.5", and frequency information indicates that a frequency at which the POI appears locally on the client is 3, representing popularity of the POI.

In this embodiment, the POI corresponding to each address represents a POI having the address, or an address of a POI is an address corresponding to the POI.

That a POI corresponding to each address matches the first search text may be understood as that, there is a correlation between related content of the POI corresponding to each address and the first search text. For example, that there is a correlation between related content of the POI corresponding to each address and the first search text may be represented by using a manner in which the related content of the POI is the same as or partially the same as content of the first search text, where the related content of the POI may be at least one of a type of the POI, a name of the POI, or an address of the POI. For example, the first search text is "Atour", an address indicated by the first address information is an address of the Atour Hotel matching "Atour", "Atour" is a name of the POI, and the content of the first search text is the same as and correlated with the name of the POI.

The addresses in the address set mean at least some of the addresses in the address set, and the at least some of the addresses are some or all addresses in the address set.

Each address indicated by the first address information is related to an address in the address set, and there are the following two explanations.

First explanation: Each address indicated by the first address information is an address in the address set. For example, the address set includes four addresses, where one address is "Zhangbawu Road, High-tech Zone, Xi'an"; and the first address information indicates one address, the address indicated by the first address information is also "Zhangbawu Road, High-tech Zone, Xi'an", and the address indicated by the first address information is an address in the address set.

Second explanation: Each address indicated by the first address information is obtained based on an address that is in the address set and that corresponds to each address, where the address that is in the address set and that corresponds to each address is an address that is in the address set and that has a same region range as each address. For ease of description, "the address that is in the address set and that corresponds to each address" is briefly described as "a corresponding address in the address set". For example, a region range of each address indicated by the first address information is greater than a region range of the corresponding address in the address set. For example, the address set includes four addresses, where two addresses are respectively "Zhangbawu Road, High-tech Zone, Xi'an" and "Chongye Road, Yanta District, Xi'an"; and the first address information indicates two addresses, where one address in the first address information is "High-tech Zone, Xi'an", a region range of "High-tech Zone, Xi'an" is greater than a region range of "Zhangbawu Road, High-tech Zone, Xi'an", the other address in the first address information is "Yanta District, Xi'an", and a region range of "Yanta District, Xi'an" is greater than a region range of "Chongye Road, Yanta District, Xi'an".

In this embodiment, in a process of determining the second search text, the client may perform, based on the first search text and the first user data, filtering for a first time to obtain candidate POI texts matching the first search text. If a quantity of the candidate POI texts obtained after the first time of filtering is small, the second search text may be determined based on the candidate POI texts obtained after the first time of filtering. If the quantity of the candidate POI texts obtained after the first time of filtering is large, filtering may be performed for a second time to obtain fewer candidate POI texts, to reduce a search load of the server, so that the second search text is determined based on the candidate POI texts obtained after the second time of filtering.

The following separately describes in detail two manners in which the client determines, based on the first search text and the first user data, the second search text based on filtering once or filtering twice.

Manner 1: Filtering Once

FIG. 5 is an example schematic flowchart of determining, by a client based on a first search text and first user data, a second search text according to an embodiment of this application.

In S221, the client filters, based on the first search text, the first user data to obtain a candidate POI text set, where each candidate POI text in the candidate POI text set matches the first search text and includes address information, and an address indicated by the address information in each candidate POI text is an address in the address set.

As described previously, the client may obtain a POI text set based on the first user data; and the client may perform text matching between the first search text and POI texts in the POI text set, and filter the POI text set to obtain at least one candidate POI text that includes address information and matches the first search text, where the at least one candidate POI text forms the candidate POI text set.

Each candidate POI text in the candidate POI text set matches the first search text, each candidate POI text includes one piece of address information, and the address information of each candidate POI text indicates one address.

It needs to be understood that, in this process, the client has filtered out a POI text that does not have address information, and each candidate POI text obtained through the filtering includes the address information.

It needs to be further understood that, as described in this embodiment, that the candidate POI text matches the first search text indicates that the candidate POI text includes content that is the same as a part or all of the content of the first search text. For example, the first search text is "Atour", and the candidate POI text obtained through the filtering includes "Atour".

When a quantity of the candidate POI texts in the candidate POI text set is greater than 1, other information of a POI corresponding to each candidate POI text is not limited. The first search text being "Atour" is still used as an example. The candidate POI texts may be "Atour" with different addresses. For example, the candidate POI texts may be Atour Hotels in different regions of Hangzhou, Atour Hotels in different regions of Xi'an, or the like.

It is assumed that the POI text set includes four POI texts, and the four POI texts are respectively shown as follows:

POI text 1: Atour, hotel, xxx1 Hangzhou, effective time 1, and a frequency of 3;
POI text 2: Atour, hotel, xxx2 Hangzhou, effective time 2, and a frequency of 2;
POI text 3: Seven Days, hotel, xxx3 Shenzhen, effective time 3, and a frequency of 3; and
POI text 4: Shangri-La, hotel, xxx4 Shenzhen, effective time 4, and a frequency of 3.

The first search text is "Atour", two candidate POI texts are obtained based on the four POI texts and the first search text, and the two candidate POI texts are the POI text 1 and the POI text 2.

In this embodiment, for example, the client may include an index module, the index module includes an index library corresponding to each type of POIs, and the index library for each type of POIs stores a POI text corresponding to the type. For example, the index module includes index libraries whose types are respectively "hotel", "scenic spot", and "restaurant", the plurality of POI texts obtained based on the first user data correspond to three types of POIs, a POI text corresponding to "hotel" is stored into an index library whose type is "hotel", a POI text corresponding to "scenic spot" is stored into an index library whose type is "scenic spot", and a POI text corresponding to "restaurant" is stored into an index library whose type is "restaurant".

On this basis, the client may search, based on the first search text, an index library corresponding to a POI type that matches the first search text for a candidate POI text matching the first search text. For example, the first search text is "Atour", the type is "hotel", and the client searches the index library whose type is "hotel" for a candidate POI text matching "Atour".

In S222, the client determines, based on the first search text and the candidate POI text set, the second search text, where each address indicated by the first address information is related to an address indicated by the address information in the candidate POI text set.

In this step, the client determines the first address information based on the address information in the candidate POI text set, and determines, based on the first address information and the first search text, the second search text. For example, the client may combine the first address information and the first search text to form the second search text.

The address information in the candidate POI text set means at least some of the address information in the candidate POI text set, where the at least some of the address information is a part or all of the address information in the candidate POI text set, and each piece of address information in the at least some of the address information is address information in one candidate POI text. It needs to be understood that, all address information in the candidate POI text set represents a sum of address information of all candidate POI texts in the candidate POI text set. For example, the candidate POI text set includes three candidate POI texts, the three candidate POI texts include three pieces of address information, and the three pieces of address information are all the address information in the candidate POI text set.

Each address indicated by the first address information is related to an address indicated by the address information in the candidate POI text set, and there may be two explanations. A first explanation is that, each address indicated by the first address information is an address indicated by the address information in the candidate POI text set. A second explanation is that, each address indicated by the first address information is obtained based on an address that is in the addresses indicated by the address information in the candidate POI text set and that corresponds to each address, where the address that is in the addresses indicated by the address information in the candidate POI text set and that corresponds to each address is an address that is in the addresses indicated by the address information in the candidate POI text set and that has a same region range as each address. For specific example descriptions of the two explanations, refer to the foregoing related descriptions about "each address indicated by the first address information is related to an address in the address set". Simply replace "an address in the address set" in the foregoing descriptions with "an address indicated by the address information in the candidate POI text set".

For example, the first search text is "Atour", the candidate POI text set includes two candidate POI texts, address information of one candidate POI text indicates an address "Jiangling Road, Binjiang District, Hangzhou", and address information of the other candidate POI text indicates an address "Fuyang District, Hangzhou". Then the second search text may be represented as: Atour, Binjiang Hangzhou, Fuyang Hangzhou; or the second search text may be represented as: Atour, Jiangling Binjiang Hangzhou, Fuyang Hangzhou.

It needs to be understood that, a smaller quantity of candidate POI texts is better, and when the quantity of candidate POI texts is relatively small or very small, the second search text may be determined by filtering the POI text set only once, to avoid a relatively long processing delay that would otherwise be caused by a plurality of times of extra filtering by the client.

Manner 2: Filtering Twice

When the quantity of candidate POI texts is large, the candidate POI text set may be further filtered to reduce the quantity of candidate POI texts, to obtain simple and valid address information, thereby reducing the search load of the server.

FIG. 6 is another example schematic flowchart of determining, by a client based on a first search text and first user data, a second search text according to an embodiment of this application.

In S221, the client filters, based on the first search text, the first user data to obtain a candidate POI text set, where each candidate POI text in the candidate POI text set matches the first search text and includes address information, and an address indicated by the address information in each candidate POI text is an address in the address set.

It needs to be understood that this step is a process of filtering for a first time during the twice filtering.

For a specific description of the step S221, refer to related descriptions about the step S221 in Manner 1.

In S2221, the client filters, based on an effective time of a POI corresponding to each candidate POI text and/or popularity of the POI corresponding to each candidate POI text, the candidate POI text set to obtain an ultimate candidate POI text.

It needs to be understood that this step is a process of filtering for a second time during the twice filtering.

The ultimate candidate POI text includes at least one candidate POI text. In an ideal case, the ultimate candidate POI text includes one candidate POI text, or in other words, a quantity of ultimate candidate POI texts is 1.

It needs to be understood that, there are three cases for the effective time of the POI corresponding to each candidate POI text and/or the popularity of the POI corresponding to each candidate POI text: a case in which there is only the effective time of the POI corresponding to each candidate POI text, a case in which there is only the popularity of the POI corresponding to each candidate POI text, and a case in which there are both the effective time of the POI corresponding to each candidate POI text and the popularity of the POI corresponding to each candidate POI text.

In this step, the client may filter, based on the effective time of the POI, or the popularity of the POI, or both the effective time of the POI and the popularity of the POI, the candidate POI text set to obtain the ultimate candidate POI text.

In some embodiments, the client filters, based on the effective time of the POI corresponding to each candidate POI text, the candidate POI text set to obtain the ultimate candidate POI text. For example, the client may compare a search time of the first search text with the effective time of the POI corresponding to each candidate POI text. If the search time is within the effective time of the POI, it indicates that the POI may be a valid POI, and the candidate POI text corresponding to the POI is retained; or if the search time is beyond the effective time of the POI, it indicates that the POI may be an invalid POI, and the candidate POI text corresponding to the POI is abandoned. The client ultimately obtains, through the filtering, the ultimate candidate POI text meeting the foregoing condition.

For example, the candidate POI text set includes two candidate POI texts, which are respectively a POI text 1: Atour, hotel, xxx1 Hangzhou, effective time 1 (2021.4.3-4.5), and a frequency of 3; and a POI text 2: Atour, hotel, xxx2 Hangzhou, effective time 2 (2020.10.5-10.9), and a frequency of 2. The search time of the first search text is 2021.4.3, and the search time is within the effective time (2021.4.3-4.5) of a POI corresponding to the POI text 1. Therefore, the POI text 1 is obtained, through the filtering, from the candidate POI text set, and the ultimate candidate POI text is the POI text 1.

In some other embodiments, the client filters, based on the popularity of the POI corresponding to each candidate POI text, the candidate POI text set to obtain the ultimate candidate POI text. For example, the client compares the popularity of the POI corresponding to each candidate POI text with each other, and obtains, through the filtering, candidate POI texts corresponding to POIs with higher popularity, to obtain the ultimate candidate POI text. For example, the client uses a candidate POI text corresponding to a POI with highest popularity as the ultimate candidate POI text.

In an example, popularity of a POI corresponding to a candidate POI text may include: a frequency at which the POI corresponding to the candidate POI text appears on the client. It needs to be understood that a higher frequency of the POI indicates higher popularity of the POI to which the user pays attention; and on the contrary, a lower frequency of the POI indicates lower popularity of the POI to which the user pays attention.

For example, the candidate POI text set includes two candidate POI texts, which are respectively a POI text 1: Atour, hotel, xxx1 Hangzhou, effective time 1, and a frequency of 3; and a POI text 2: Atour, hotel, xxx2 Hangzhou, effective time 2, and a frequency of 2. The frequency "3" of a POI corresponding to the POI text 1 is greater than the frequency "2" of a POI corresponding to the POI text 2, meaning that the POI corresponding to the POI text 1 has higher popularity. Therefore, the POI text 1 is obtained, through the filtering, from the candidate POI text set, and the ultimate candidate POI text is the POI text 1.

In some other embodiments, the client may filter, based on both the effective time of the POI corresponding to each candidate POI text and the popularity of the POI corresponding to each candidate POI text, the candidate POI text set to obtain the ultimate candidate POI text.

In an example, when the search time of the first search text is within the effective time of POIs corresponding to some candidate POI texts in the candidate POI text set, the client may use a candidate POI text whose POI has relatively high popularity as the ultimate candidate POI text, where the search time of the first search text is within an effective time of the POI.

In another example, when the search time of the first search text is within the effective time of all POIs corresponding to the candidate POI texts or is not within an effective time of any POI corresponding to the candidate POI texts, because the ultimate candidate POI text cannot be effectively obtained through the filtering, a candidate POI text whose POI has relatively high popularity may be used as the ultimate candidate POI text.

In S2222, the client determines, based on the first search text and the ultimate candidate POI text, the second search text, where each address indicated by the first address information is related to an address indicated by address information in the ultimate candidate POI text.

In this step, the client may determine the first address information based on the address information in the ultimate candidate POI text; and determine, based on the first address information and the first search text, the second search text. For example, the client may combine the first address information and the first search text to form the second search text.

The address information in the ultimate candidate POI text means at least some of the address information in the ultimate candidate POI text, the at least some of the address information is a part or all of all address information in the ultimate candidate POI text, and each piece of address information in the at least some of the address information is address information in a candidate POI text. It needs to be understood that all address information in the ultimate candidate POI text is a sum of address information of each candidate POI text in the ultimate candidate POI text. For example, the ultimate candidate POI text set includes two candidate POI texts, the two candidate POI texts include two pieces of address information, and the two pieces of address information are all the address information in the ultimate candidate POI text.

Each address indicated by the first address information is related to an address indicated by the address information in the ultimate candidate POI text, and there may be two explanations. For specific descriptions, refer to the foregoing related descriptions about "each address indicated by the first address information is related to an address indicated by the address information in the candidate POI text set". Simply replace "the candidate POI text set" in the foregoing descriptions with "the ultimate candidate POI text".

It needs to be noted that, when the ultimate candidate POI text includes only one candidate POI text, the address information in the ultimate candidate POI text is address information in the candidate POI text; and the client may use the address information in the candidate POI text as the first address information, or the client obtains the first address information based on the address information in the candidate POI text, and then combines the first address information and the first search text to obtain the second search text. For example, the first search text is "Atour", the ultimate candidate POI text includes only one candidate POI text, and the address information in the candidate POI text indicates an address "Jiangling Road, Binjiang District, Hangzhou". Then an address indicated by the first address information may be "Binjiang Hangzhou", and the second search text is represented as: Atour, Binjiang Hangzhou; or an address indicated by the first address information may be "Jiangling Binjiang Hangzhou", and the second search text is represented as: Atour, Jiangling Binjiang Hangzhou.

In S230, the client sends a search request to the server, where the search request includes the second search text.

In some embodiments, the second search text is an encrypted search text.

For example, to better protect user privacy, the client may store the second search text in a trusted execution environment (TEE) in the client, and encrypt the second search text in the TEE. Because the second search text includes the first address information involving user privacy, to avoid disclosure of the user privacy in a data transmission process, the second search text is encrypted, so that the disclosure of the user privacy in the data transmission process can be avoided, thereby improving security.

In some other embodiments, the search request includes the first search text and the second search text. For example, the first search text and the second search text are encrypted search texts.

For example, to better protect user privacy, the client may store the first search text and the second search text in the TEE in the client, and encrypt the first search text and the second search text in the TEE.

The first address information in the second search text, which is obtained by the client by performing address extension based on the first user data, is a possible search intention of the user and is kind of a guessing behavior. To avoid an intention guessing error, the search request carries both the first search text entered by the user and the second search text obtained by performing the address extension, where the kept first search text indicates an original intention of the user, and the second search text indicates a real search intention of the user. In this way, the server can feed back all possible search results as much as possible, to comprehensively indicate all intentions of the user, thereby improving comprehensiveness and accuracy of the search results while implementing a personalized search, to further improve user experience.

In S240, the server sends, in response to the search request, a plurality of POI search results to the client, where the plurality of POI search results include M POI search results matching the second search text, and M is an integer greater than or equal to 1.

Correspondingly, the client receives the plurality of POI search results.

In this step, the server searches, based on the search request, a database for POI search results meeting the search request, where the POI search results meeting the search request mean POI search results matching a search text in the search request.

In some embodiments, the search request includes the second search text, and correspondingly, the plurality of POI search results include M POI search results matching the second search text.

In an example, if the second search text is encrypted, the server decrypts the second search text, and searches the database for POI search results matching the second search text.

For example, to prevent the second search text from being disclosed and better protect user privacy, the server may store the second search text in the TEE, and decrypt the second search text in the TEE. It needs to be understood that, a POI search result matching the second search text indicates that the second search text matches the POI search result. For example, that the second search text matches the POI search result may be understood as that, there is a correlation between the second search text and the POI search result. For example, that there is a correlation between the second search text and the POI search result may be indicated by using a manner in which content of the second search text is the same as or partially the same as related content of a POI corresponding to the POI search result. For example, the second search text is "Atour, Binjiang Hangzhou", and a POI corresponding to a POI search result matching "Binjiang Hangzhou" is an Atour Hotel located in the Binjiang District of Hangzhou.

FIG. 3 and FIG. 4 in the foregoing descriptions are still used as an example. It is assumed that the user is in Shenzhen, makes a reservation for the Atour Hotel on the Jiangling Road in the Binjiang District of Hangzhou as shown in FIG. 4, and receives an SMS message indicating that the hotel reservation is successful. The user enters the first search text "Atour" in the search box 301 in the GUI shown in FIG. 3, the second search text obtained by the client based on the first search text and the first user data (including the SMS message indicating that the reservation of the hotel in Hangzhou is successful) is "Atour, Binjiang Hangzhou", and the second search text "Atour, Binjiang Hangzhou" is sent to the server by using the search request. POI search results matching the second search text "Atour, Binjiang Hangzhou" that are fed back by the server are shown in a result list box 302 in FIG. 3. The result list box 302 includes seven (that is, M=7) POI search results, where one POI search result corresponds to one POI, and POIs corresponding to the POI search results are all Atour Hotels in the Binjiang District of Hangzhou (for brevity, only a specific address of a POI 2 is shown in the figure), and the POI 2 is the hotel that the user expects to find. It can be learned that, compared with the POI search results fed back based on the first search text "Atour" according to the conventional technology shown in FIG. 1, the POI search results fed back in this embodiment can better indicate a real intention of the user, conform to an actual requirement of the user, and meet a personalized requirement of the user, thereby improving user experience.

In some other embodiments, the search request includes the first search text and the second search text. Because the second search text includes the first search text, a search result matching the second search text definitely matches the first search text. Therefore, the plurality of POI search results all match the first search text, the M POI search texts also match the second search text, and remaining N search texts match only the first search text. Therefore, the plurality of POI search texts include: the M POI search results and N POI search results matching the first search text other than the M POI search results.

In an example, if the first search text and the second search text are encrypted, the server decrypts the first search text and the second search text, and searches the database for POI search results matching the first search text and POI search results matching the second search text.

For example, to prevent the second search text and the first search text from being disclosed and better protect user privacy, the server may store the first search text and the second search text in the TEE, and decrypt the first search text and the second search text in the TEE.

It needs to be understood that, in this embodiment, a POI search result matching the first search text indicates that the first search text matches the POI search result. For a specific description of "the first search text matches the POI search result", refer to the foregoing related descriptions about "the second search text matches the POI search result".

Figure 7:
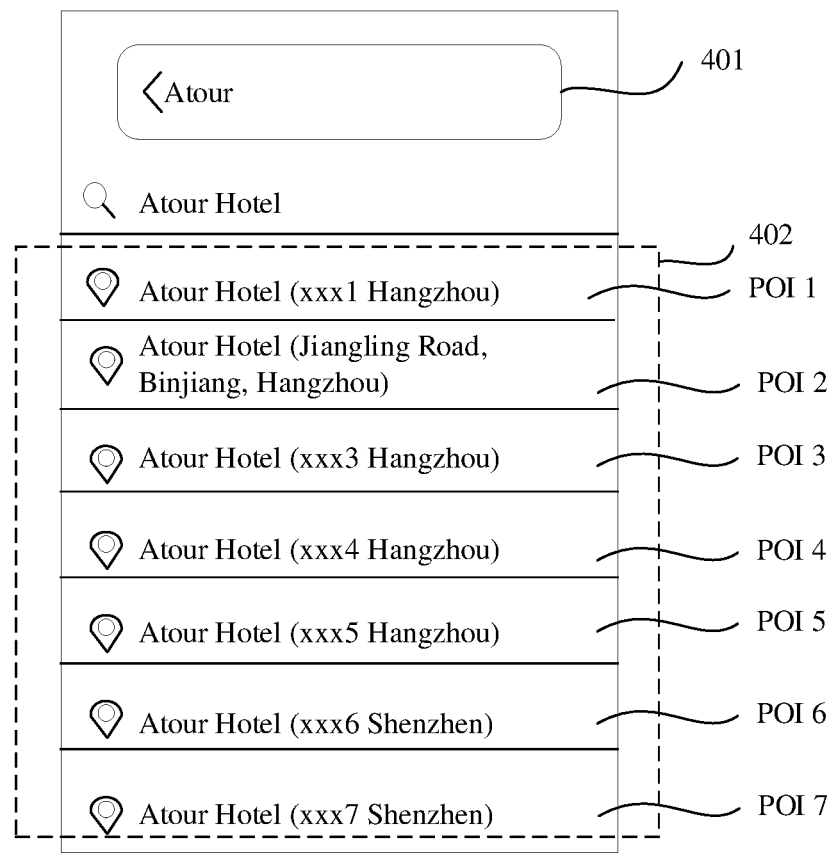
FIG. 7 to FIG. 9 are other exemplary GUIs of a map according to an embodiment of this application.

FIG. 7 is another example GUI of a map according to an embodiment of this application. It is still assumed that the user is located in Shenzhen, makes a reservation for the Atour Hotel on the Jiangling Road in the Binjiang District of Hangzhou, and receives an SMS message indicating that the hotel reservation is successful. The user enters the first search text "Atour" in a search box 401 in the GUI shown in FIG. 7, and the second search text obtained by the client based on the first search text and the first user data (including the SMS message indicating that the reservation of the hotel in Hangzhou is successful) is "Atour, Binjiang Hangzhou". The first search text "Atour" and the second search text "Atour, Binjiang Hangzhou" are sent to the server by using the search request. POI search results fed back by the server are shown in a result list box 402 in FIG. 7. The result list box 402 includes seven POI search results, where one POI search result corresponds to one POI, and first five (that is, M=5) POI search results match both the second search text and the first search text, POIs corresponding to the first five POI search results are a POI 1 to a POI 5, indicating that the first five POI search results are all Atour Hotels in the Binjiang District of Hangzhou (for brevity, only a specific address of a POI 2 is shown in the figure), and last two (that is, N=2) POI search results are POI search results matching only the first search text "Atour", indicating that the last two POI search results are all Atour Hotels in Shenzhen.

It needs to be understood that, in a process in which the server feeds back the POI search results based on the search request, the server may rank the plurality of POI search texts, and feed back the plurality of POI search results in a rank to the client. As shown in FIG. 3 or FIG. 7, seven POI search results are displayed in a rank in the result list box.

Generally, the server may perform feature extraction on each POI search result to obtain a feature value, use the feature value as inputs of a ranking model, obtain a result value corresponding to each POI search result by using the ranking model, and rank the plurality of POI search results based on the result value corresponding to each POI search result, to obtain a plurality of POI search results in a rank. For a specific implementation process, refer to an existing ranking technology. It needs to be understood that, the ranking model used by the server may be various ranking models capable of ranking, and inputs of the ranking models are different. This is not limited in this embodiment.

It needs to be noted that, the ranks of the plurality of POI search results shown in FIG. 3 and FIG. 7 are merely examples for description and should not constitute a limitation thereof, and it suffices that there is a POI search result matching the second search text in the plurality of POI search results. For example, in FIG. 3, a POI search result corresponding to the POI 2 may be alternatively a first POI search result in the rank.

In conclusion, according to the method of searching for a POI provided in this embodiment, based on the first search text entered by the user and the first user data stored in the client, the client performs address extension on the first search text to obtain the second search text that includes the first search text and includes the first address information obtained based on the first user data, and sends the second search text to the server by using the search request; and the server feeds back the plurality of POI search results based on the second search text. Because the second search text is a search text that is obtained based on the first user data of the client and includes the first address information, and the first address information is closely related to the user, it is highly probable that an address indicated by the first address information represents an address of a POI that the user expects to find. Therefore, it is highly probable that the POI search results fed back by the server based on the second search text include a search result of the POI that the user is interested in or expects, to conform to a real search intention of the user and meet a personalized requirement of the user, thereby improving both user experience and search performance. In addition, because the first user data is stored in the personal client of the user, a problem of user privacy disclosure is avoided as much as possible.

As described previously, the server feeds back the plurality of POI search results in a rank. In a ranking process, data used by the server is limited to only data on the server that corresponds to an APP currently used by the user, and data sharing between servers corresponding to different APPs cannot be implemented. For example, a server corresponding to an application A cannot use data on a server corresponding to an application B. Therefore, although it is highly probable that the POI search results fed back by the server include a search result of the POI that the user expects, the rank of the POI search results may not be optimal, thereby failing to nicely provide the user with a personalized rank. For example, the user is currently using a map; and when ranking the POI search results, a server corresponding to the map cannot use data in a server corresponding to another application such as Taobao or Meituan, and a rank of the POI search results fed back by the server corresponding to the map may not be optimal.

For the user, the search result of the POI in which the user is interested is expected to be in a preceding place in the rank. In an ideal case, the search result of the POI in which the user is interested is expected to be located in a first place in the rank. For example, the plurality of POI search results shown in FIG. 3 are used as an example. The user expects that a POI search result corresponding to the POI 2 (the Atour Hotel on the Jiangling Road in the Binjiang District of Hangzhou) is a first POI search result in the rank, but actually, the POI search result corresponding to the POI 2 is a second POI search result in the rank. For the user, a personality feature of the rank is insufficient, and the rank is not an optimal rank.

Therefore, it is proposed in this embodiment that, a quantity of historical clicks about a POI may be further obtained based on SDK log data that indicates the user's behavior, and the plurality of POI search results are re-ranked, to obtain the POI search results in a relatively accurate rank. The rank is more personalized with a personal style of the user, and can well meet the user's requirement, thereby further improving user experience.

Refer to FIG. 2 again. In S250, the client performs feature extraction on each POI search result, and determines at least one feature value corresponding to each POI search result, where the at least one feature value includes a quantity of historical clicks on a POI corresponding to each POI search result, the quantity of historical clicks is obtained based on software development kit (SDK) log data of the client, and the SDK log data records a click operation performed by the user on the POI on each APP.

The SDK log data is data that records the user's behavior, and mainly records usage of APPs operated by the user, including a click operation performed by the user on a POI on each APP. During implementation, each APP corresponds to one piece of SDK log data. For ease of description, in this embodiment, the SDK log data corresponding to each APP is denoted as sub-SDK log data. The SDK log data in this embodiment includes the sub-SDK log data corresponding to each APP, and one piece of sub-SDK log data corresponds to one APP.

For any APP, if the user clicks a specific POI displayed on a specific APP, the client records the user's click operation on the POI into sub-SDK log data corresponding to the APP. Because the SDK log data includes the sub-SDK log data corresponding to each APP, for a specific POI, the client may obtain, based on a click operation performed by the user on the POI on each APP in the SDK log data, a quantity of historical clicks by the user on the POI. Therefore, for the POI corresponding to each POI search result in this embodiment, the user may obtain, based on a click operation performed by the user on the POI corresponding to each POI search result on each APP in the SDK log data, a quantity of historical clicks on the POI corresponding to each POI search result.

It needs to be understood that the quantity of historical clicks on the POI corresponding to each POI search result is a sum of clicks by the user on the POI corresponding to each POI search result on each APP. For example, a POI 1 corresponding to a specific POI search result is used as an example. The SDK log data records two click operations performed by the user on the POI 1 in an APP 1, one click operation performed by the user on the POI 1 in an APP 2, and two click operations performed by the user on the POI 1 in an APP 3; and there is no click operation by the user on the POI 1 in SDK log data of other APPs. Therefore, according to the SDK log data, the client obtains a quantity of historical clicks by the user on the POI 1 in the APP 1 to the APP 3 and the quantity is 5.

It needs to be noted that, a larger quantity of times a POI is clicked by the user indicates that the user pays more attention to the POI and then the POI is more important. Therefore, ranking the plurality of POI search results based on the quantity of historical clicks can obtain a more personalized rank for the user. More importantly, compared with a way in which the server can obtain a quantity of clicks on the POI in a specific APP only, in this embodiment, all historical clicks on the POI can be obtained by using the SDK log data that records the click operation performed on the POI on each APP, thereby implementing data sharing between the APPs and obtaining a more personalized rank for the user to meet a personalized requirement of the user. In addition, in the rank, it is highly probable that a POI search result expected by the user is a first POI search result in the plurality of POI search results, so that the user can quickly see the expected POI search result, thereby further improving user experience.

In some embodiments, the at least one feature value corresponding to each POI search result includes one feature value, and the feature value is the quantity of historical clicks on the POI corresponding to each POI search result.

In some other embodiments, the at least one feature value corresponding to each POI search result is a plurality of feature values, and not only includes the quantity of historical clicks on the POI corresponding to each POI search result, but also includes at least one of the following:

a feature value used to represent relevance between the second search text and the POI corresponding to each POI search result, or a distance between an address at which the client is currently located and the POI corresponding to each POI search result, or a feature value of a type of the POI corresponding to each POI search result.

For the feature value used to indicate the relevance between the second search text and the POI corresponding to each POI search result, for example, the client may obtain, based on the second search text and each POI search result, the feature value used to indicate the relevance between the second search text and the POI corresponding to each POI search result.

In an example, the feature value used to indicate the relevance between the second search text and the POI corresponding to each POI search result may include: a maximum length of a common substring between the second search text and a name of the POI corresponding to each POI search result, and/or a maximum length of a common substring between the second search text and an address of the POI corresponding to each POI search result. For example, the second search text is "Atour, Binjiang Hangzhou", a name of a POI corresponding to a specific POI search result is "Atour", and an address of the POI is "Jiangling Binjiang Hangzhou". Then a maximum length of a common substring between the second search text and the name of the POI is 2, and a maximum length of a common substring between the second search text and the address of the POI is 4.

For the distance between the address at which the client is currently located and the POI corresponding to each POI search result, it needs to be understood that, the address at which the client is currently located may be alternatively understood as an address at which the user holding the client is currently located. It needs to be further understood that, the distance between the address at which the client is currently located and the POI corresponding to each POI search result indicates a distance between the address at which the client is currently located and the address of the POI corresponding to each POI search result.

For the feature value of the type of the POI corresponding to each POI search result, for example, the client may determine, based on whether the type of the POI corresponding to each POI search result is the same as the type of the POI corresponding to the second search text, the feature value of the type of the POI corresponding to each POI search result.

In an example, if the type of the POI corresponding to each POI search result is the same as the type of the POI corresponding to the second search text, the feature value of the type of the POI corresponding to the POI search result may be 1; or if the type of the POI corresponding to each POI search result is different from the type of the POI corresponding to the second search text, the feature value of the type of the POI corresponding to the POI search result may be 0. For example, the second search text is "Atour, Binjiang Hangzhou", and the type of the POI is a hotel. If a type of a POI corresponding to a specific POI search result is a restaurant, a feature value of the type of the POI corresponding to the POI search result is 0; or if the type of the POI corresponding to the POI search result is a hotel, the feature value of the type of the POI corresponding to the POI search result is 1.

In S260, the client ranks the plurality of POI search results based on the at least one feature value corresponding to each POI search result, to determine a recommended rank.

In this way, the client may present the plurality of POI search results in the recommended rank to the user.

For ease of description of a process in which the client determines the recommended rank based on the at least one feature value corresponding to each POI search result, this embodiment further defines two other ranks than the recommended rank, which are respectively denoted as a server rank and a client rank. The server rank indicates a ranking result obtained after the server ranks the plurality of POI search results. The client rank indicates a ranking result obtained after the client ranks the plurality of POI search results. Because the client rank uses the quantity of historical clicks on the POI on each APP, which is obtained based on the click operation on the POI on each APP as recorded in the SDK log data, but the click operation on each APP is unavailable for use by the server, it is highly probable that the ranking result of the server rank is different from the ranking result of the client rank. However, in some actual special cases, the ranking result of the client rank may be the same as the ranking result of the server rank.

In a process in which the client determines the recommended rank based on the at least one feature value, in one manner, the client rank may be used as the recommended rank; or in another manner, the client rank and the server rank may be comprehensively considered to obtain the recommended rank.

The following describes, based on the foregoing two manners, a process in which the client determines the recommended rank.

Manner A: The Recommended Rank is the Client Rank.

In this manner, the client determines the client rank based on the at least one feature value corresponding to each POI search result, and presents the client rank as the ultimate recommended rank to the user.

Case 1: The at least one feature value corresponding to each POI search result includes a plurality of feature values, and the plurality of feature values include the quantity of historical clicks on the POI corresponding to each POI search result and at least one of the following: a feature value used to indicate relevance between the second search text and the POI corresponding to each POI search result, a distance between an address at which the client is currently located and the POI corresponding to each POI search result, or a feature value of a type of the POI corresponding to each POI search result.

In this case, the client may use a ranking model, and use the plurality of feature values corresponding to each POI search result as inputs of the ranking model. The plurality of feature values are computed by using the ranking model, to obtain an output result. The client ranks the plurality of POI search results based on the output result corresponding to each POI search result, to obtain the client rank. For example, in a ranking process, ranking is performed in descending order of the output results, to obtain the client rank.

For example, if there are POI search results with a same output result, further ranking may be performed in lexicographic order. For example, output results of a POI search result 1 and a POI search result 2 are the same. A POI 1 corresponding to the POI search result 1 is "Tian'anmen", and a POI 2 corresponding to the POI search result 2 is "Gu Gong". The initial letter of "Tian" in "Tian'anmen" is "t", the initial letter of "Gu" in "Gu Gong" is "g", and "g" comes before "t". Therefore, in a rank, "Gu Gong" precedes "Tian'anmen".

For ease of description, the quantity of historical clicks on the POI corresponding to each POI search result is represented by $x_{1i}$, the maximum length of the common substring between the second search text and the name of the POI is represented by $x_{2i}$, the maximum length of the common substring between the second search text and the address of the POI is represented by $x_{3i}$, the distance between the address at which the client is currently located and the POI is represented by $x_{4i}$, the feature value of the type of the POI is represented by $x_{5i}$, and the output result obtained based on $x_{1i}$, $x_{2i}$, $x_{3i}$, $x_{4i}$, and $x_{5i}$ is represented by $y_i$, where i indicates a number of a POI search result.

It is assumed that the plurality of POI search results include four POI search results, which are denoted as a POI search result 1, a POI search result 2, a POI search result 3, and a POI search result 4, where:

a plurality of feature values corresponding to the POI search result 1 are $x_{11}$, $x_{21}$, $x_{31}$, $x_{41}$, and $x_{51}$, and an output result is $y_1$;

a plurality of feature values corresponding to the POI search result 2 are $x_{12}$, $x_{22}$, $x_{32}$, $x_{42}$, and $x_{52}$, and an output result is $y_2$;

a plurality of feature values corresponding to the POI search result 3 are $x_{13}$, $x_{23}$, $x_{33}$, $x_{43}$, and $x_{53}$, and an output result is $y_3$; and a plurality of feature values corresponding to the POI search result 4 are $x_{14}$, $x_{24}$, $x_{34}$, $x_{44}$, and $x_{54}$, and an output result is $y_4$.

For the foregoing four output results, $y_1 > y_2 > y_3 > y_4$. Therefore, the recommended rank is a rank in the following sequence in turn: the POI search result 1, the POI search result 2, the POI search result 3, and the POI search result 4.

In some embodiments, in a process in which the client ranks the plurality of POI search results by using the ranking model, each feature value corresponds to one weight based on importance. The weight is higher as the importance is higher. In the process in which the client performs the ranking, the quantity of historical clicks on the POI is mainly used. Therefore, the quantity of historical clicks on the POI may have highest importance and also a highest weight.

For example, by using a simplified formula, relationships between the output results, the feature values, and the weights may be: $y_i = x_{1i} * a_1, x_{2i} * a_2, x_{3i} * a_3, x_{4i} * a_4,$ and $x_{5i} * a_5$, where $a_1$ indicates a weight corresponding to the feature value $x_{1i}$, $a_2$ indicates a weight corresponding to the feature value $x_{2i}$, $a_3$ indicates a weight corresponding to the feature value $x_{3i}$, $a_4$ indicates a weight corresponding to the feature value $x_{4i}$, and as indicates a weight corresponding to the feature value $x_{5i}$.

In some embodiments, the ranking model of the client may be a learning-to-rank (LTR) model. The LTR model is an algorithm using machine learning, and may be a model automatically trained by using the machine learning algorithm. For example, inputs of the LTR model may be feature values having different weights, and outputs are output results.

Case 2: The at least one feature value corresponding to each POI search result includes one feature value, and the feature value is the quantity of historical clicks on the POI corresponding to each POI search result.

In this case, the client ranks the plurality of POI search results based on the quantity of historical clicks on the POI corresponding to each POI search result, to obtain the client rank. For example, in a ranking process, ranking is performed in descending order of the quantity of historical clicks, to obtain the client rank. For example, if there are POI search results with a same quantity of historical clicks, the ranking may be performed in lexicographic order.

It needs to be understood that, because the recommended rank obtained based on this embodiment has considered the quantity of historical clicks on the POI corresponding to each POI search result, it is highly probable that a first POI search result in the obtained recommended rank is the POI search result expected by the user.

Figure 8:
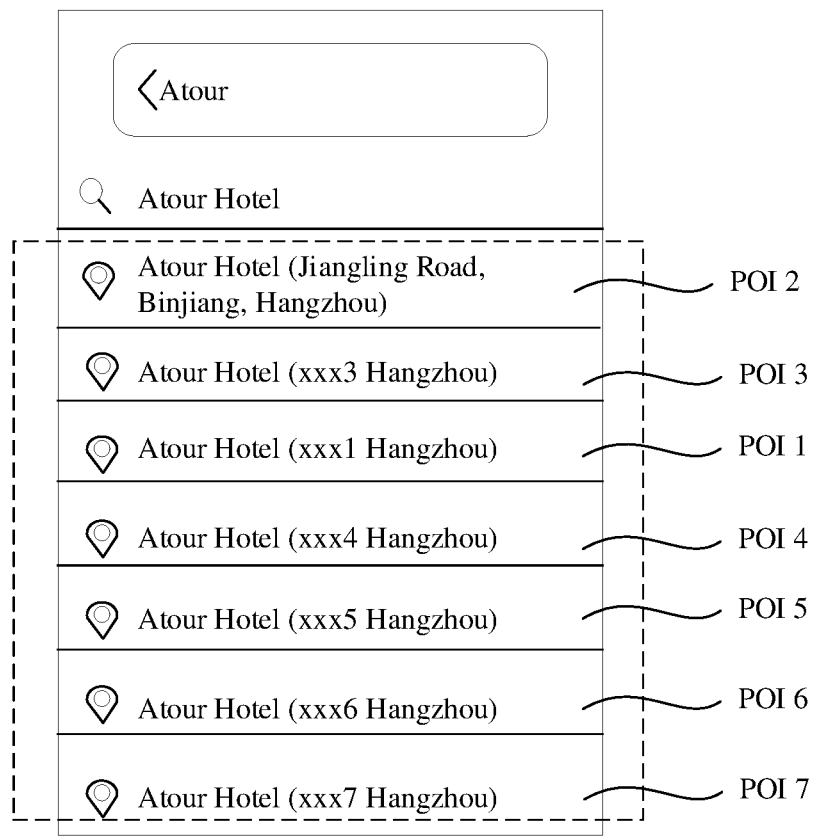

FIG. 8 is another example GUI of an example map according to an embodiment of this application. It is still assumed that the user is in Shenzhen, makes a reservation for the Atour Hotel on the Jiangling Road in the Binjiang District of Hangzhou, and receives an SMS message indicating that the hotel reservation is successful. An obtained client rank is shown in FIG. 8. A POI search result corresponding to a POI 2 is a search result expected by the user, and is a first POI search result in a plurality of POI search results. It needs to be understood that the client rank shown in FIG. 8 is merely an example for description, and should not constitute a limitation on this embodiment.

According to the method of searching for a POI provided in this embodiment, for the plurality of POI search results fed back by the server, the client performs the feature extraction on each POI search result, to obtain the at least one feature value that includes the quantity of historical clicks on the POI corresponding to each POI search result; and ranks the plurality of POI search results based on the at least one feature value, to obtain the ultimate recommended rank. Because the quantity of historical clicks by the user on the POI can indicate a degree of the user's attention to the POI, a more personalized rank for the user can be obtained by ranking the plurality of POI search results based on the quantity of historical clicks on the POI corresponding to each POI search result. More importantly, compared with a way in which the server can obtain a quantity of clicks on the POI in a specific APP only, in this embodiment, all historical clicks by the user on the POI are obtained by using the SDK log data that records the click operation performed on the POI on each APP, thereby implementing data sharing between the APPs and obtaining a more personalized rank for the user to meet a personalized requirement of the user. In addition, in the rank, it is highly probable that a POI search result expected by the user is a first POI search result in the plurality of POI search results, so that the user can quickly see the expected POI search result, thereby further improving user experience.

Manner B: The Recommended Rank is Obtained Based on the Client Rank and the Server Rank.

In some embodiments, the client ranks the plurality of POI search results based on the at least one feature value corresponding to each POI search result, to determine a client rank; and determines, based on the client rank and a server rank that is obtained by the server by ranking the plurality of POI search results, the recommended rank, where a first POI search result in the recommended rank is a first POI search result in the client rank, and a rank of POI search results in the recommended rank other than the first POI search result in the recommended rank is a rank of POI search results in the server rank other than the first POI search result in the recommended rank.

For a specific description of the client rank, refer to related descriptions about the foregoing Manner A.

It needs to be understood that, the first POI search result in the recommended rank is a POI search result in a first place in the recommended rank. Similarly, the first POI search result in the client rank is a POI search result in a first place in the client rank.

It needs to be further understood that, the first POI search result in the client rank may be the same as or different from a first POI search result in the server rank. However, regardless of whether the first POI search result in the client rank is the same as or different from the first POI search result in the server rank, during implementation, the first POI search result in the client rank needs to be used as the first POI search result in the recommended rank, and the first POI search result in the server rank does not need to be considered.

For example, the plurality of POI search results include four POI search results, which are respectively: a POI search result 1, a POI search result 2, a POI search result 3, and a POI search result 4;

the server rank is: the POI search result 2, the POI search result 1, the POI search result 3, and the POI search result 4;

the client rank is: the POI search result 1, the POI search result 2, the POI search result 3, and the POI search result 4; and the recommended rank is: the POI search result 1, the POI search result 2, the POI search result 3, and the POI search result 4.

In this example, the first POI search result in the client rank is the POI search result 1, and is used as the first POI search result in the recommended rank. A rank of POI search results in the server rank other than the first POI search result "the POI search result 1" in the recommended rank is: the POI search result 2, the POI search result 3, and the POI search result 4, which are used as a rank of POI search results in the recommended rank other than the first POI search result "the POI search result 1", to follow "the POI search result 1" in sequence based on the rank.

Figure 9:
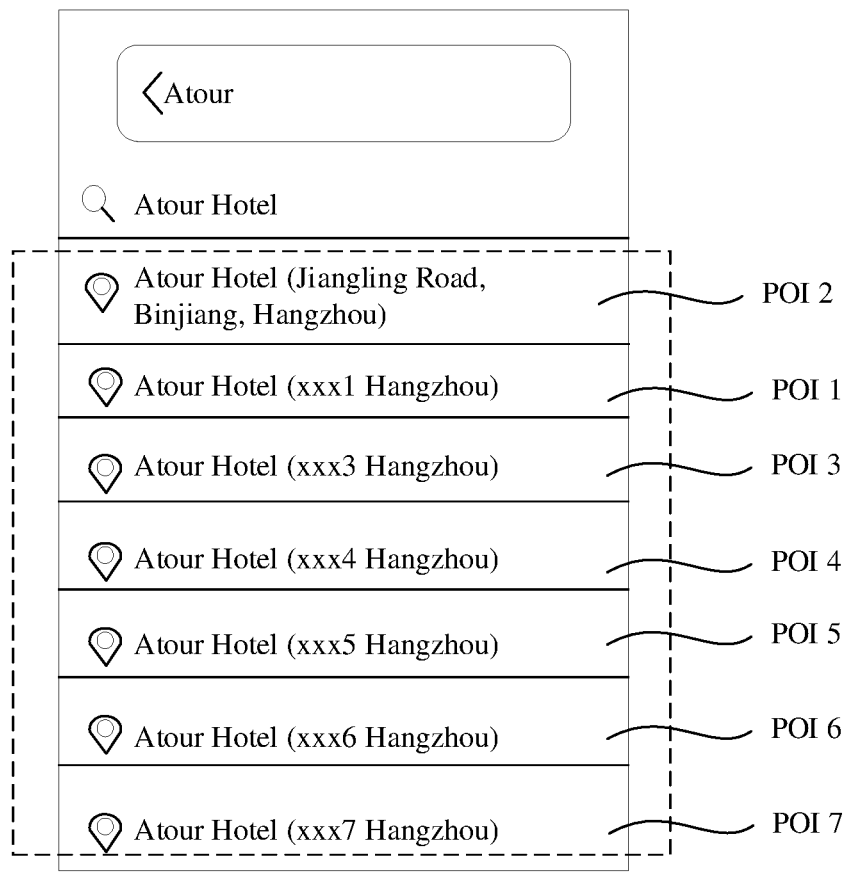

FIG. 9 is another example GUI of a map according to an embodiment of this application. It is still assumed that the user is located in Shenzhen, makes a reservation for the Atour Hotel on the Jiangling Road in the Binjiang District of Hangzhou, and receives an SMS message indicating that the hotel reservation is successful. An obtained recommended rank is shown in FIG. 9. With reference to the server rank shown in FIG. 3 and the client rank shown in FIG. 8, it can be learned that a POI search result corresponding to a POI 2 is a POI search result in the client rank shown in FIG. 8, and is a search result expected by the user; and a rank of POI search results corresponding to a POI 1, a POI 3, a POI 4, a POI 5, a POI 6, and a POI 7 is a rank of other POI search results than a POI search result corresponding to a POI 2 in the server rank shown in FIG. 3.

In this manner, because the quantity of historical clicks by the user on the POI is considered in the client rank, the first POI search result in the client rank is most likely a POI search result expected by the user. Therefore, the first POI search result in the client rank is used as the first POI search result in the recommended rank, so that the user can quickly see the expected POI search result and the recommended rank has a feature of user personality, to provide good user experience. In addition, because the server rank is related to a profile of the user and the server rank has a feature of commonality for a type of users, a rank of POI search results in the server rank other than the first POI search result in the client rank is used as the rank of the POI search results in the recommended rank other than the first POI search result in the recommended rank, to meet common experience of the user. Therefore, the recommended rank, which is obtained by combining the client rank with user personality and the server rank with globalization, has not only the feature of user personality but also the feature of user commonality; and the recommended rank provides better comprehensive performance and more desirable user experience.

As described previously, the client may rank the plurality of POI search results by using the LTR model. When the user clicks some POI search results, the client records click operations performed by the user on the POI search results into the SDK log data, to update the SDK log data. In addition, the client may update the LTR model in real time based on the updated SDK log data. In this way, the LTR model can learn a click behavior of the user in real time, and can better learn personal habits of the user more quickly and more effectively, to further meet the personalized requirement of the user, thereby further improving user experience.

Therefore, in some embodiments, after the client presents the plurality of POI search results based on the recommended rank to the user, the method further includes:

updating, by the client, the SDK log data based on a click operation performed by the user on at least one POI search result in the plurality of POI search results, to update the LTR model.

In this process, for the plurality of POI search results, the user clicks at least one POI search result in which the user is interested; and the client records a click operation performed by the user on each POI search result in the SDK log data, so that the SDK log data is updated to update the LTR model.

For example, the client obtains POI click information based on the updated SDK log data, where the POI click information includes a quantity of clicks by the user on each POI, and each POI includes a POI corresponding to the at least one POI search result. The quantity of clicks on each POI is used as inputs of the LTR model, to update the LTR model.

It needs to be understood that, the POI click information is information used to record a click operation performed by the user on each POI, including the quantity of clicks by the user on each POI. For example, the POI click information may further include other content, such as content including a time when the user clicks each POI or the like.

It needs to be further understood that, the at least one POI search result in the plurality of POI search results is a POI search result clicked by the user and is a part or all of the plurality of POI search results, and includes a POI search result ultimately expected by the user. The POI search result ultimately expected by the user is a specific search result in the plurality of POI search results. In an actual case, the user not only clicks the expected POI search result, but also may click another POI search result due to other factors. Therefore, the at least one POI search result is all POI search results clicked by the user.

For example, the client may further add the second search text to a search text set which is used to update the LTR model; add, to a POI set which is used to update the LTR model, a POI corresponding to the at least one POI search result clicked by the user; obtain, based on the search text set and the POI set, feature values, such as a feature value of relevance between each search text and each POI and a feature value of a type of a POI corresponding to each POI search result; and with reference to the quantity of clicks on each POI that is obtained based on the SDK log data, use these feature values and the quantity of clicks on each POI as inputs of the LTR model, to update the LTR model.

It needs to be understood that, the search text set, the POI set, and the SDK log data may be understood as training data used to update the LTR model.

It needs to be noted that, as described previously, each feature value input into the LTR model has a corresponding weight, and updating the LTR model is actually equivalent to updating the weight corresponding to each feature value.

Figure 10:
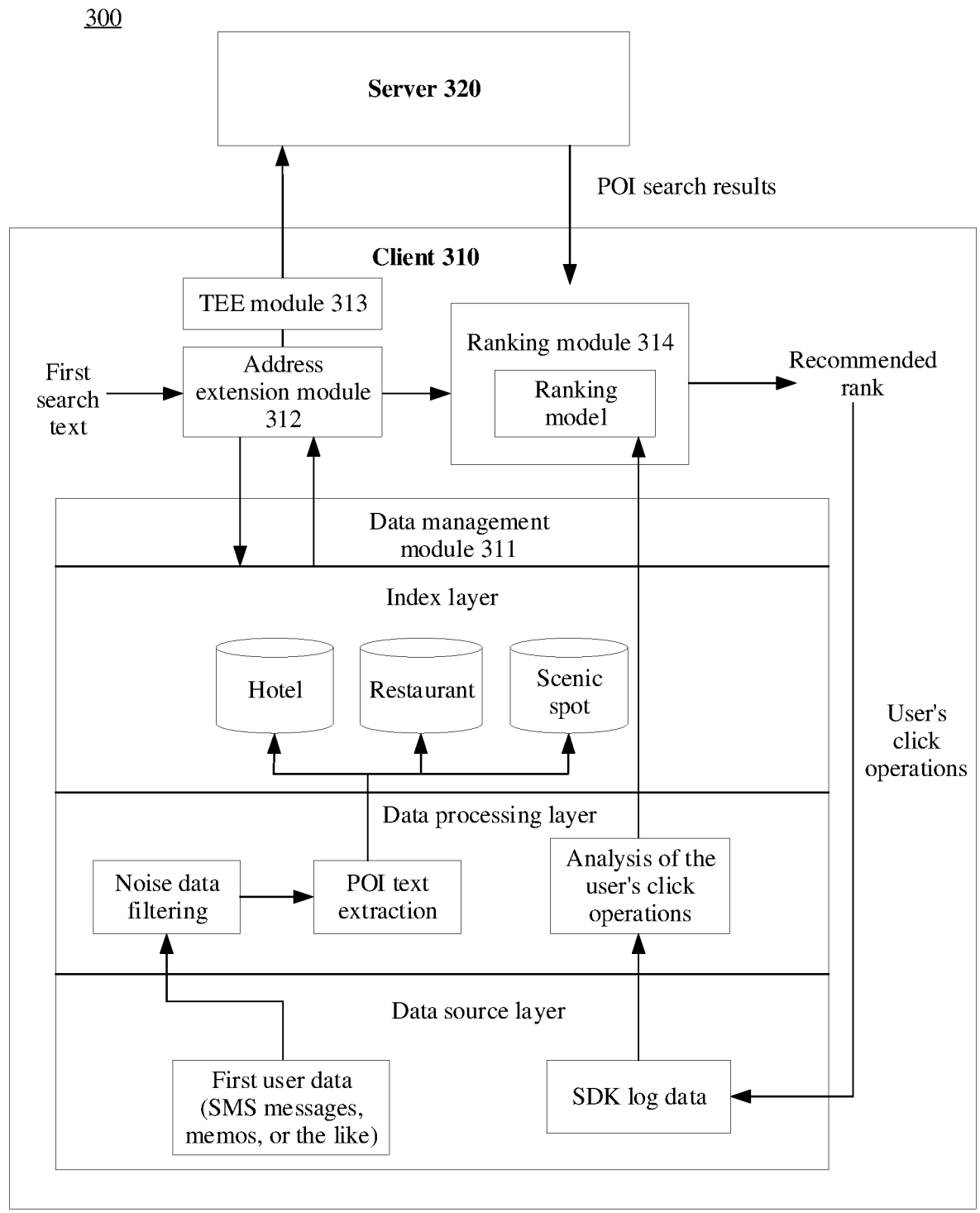
FIG. 10 is a schematic diagram of an example system for searching for a POI according to an embodiment of this application.

FIG. 10 is an example system 300 for searching for a POI according to an embodiment of this application, including a client 310 and a server 320. The client 310 includes a data management module 311, an address extension module 312, a TEE module 313, and a ranking module 314. The following introduces the system 300 with reference to the foregoing method of searching for a POI.

1. Data Management Module 311

The data management module 311 uniformly manages user data related to POI search in the client 310, and provides data and interface support for the address extension module 312 and the ranking module 314. The data management module 311 is mainly divided into three parts: a data source layer, a data processing layer, and an index layer.

Data source layer: Includes two categories of data, namely, first user data and SDK log data. The first user data is mainly application data including local personal information, such as an SMS message or a memo. The SDK log data is log information about invoking an SDK by an APP of the client. For a specific description of the two categories of data, refer to the foregoing related descriptions.

Data processing layer: Processes the data at the data source layer based on a rule, and provides the processed data for an upper layer to use.

(1) For the first user data, for example, the data processing layer is used to filter and extract the first user data, and deliver the processed data to an index library of the index layer.

In an example, the data processing layer is used to perform noise data filtering, to filter out advertisement information or useless data in the first user data by using a manner such as a keyword or a mobile number segment. For example, bank notification information and advertisement information are filtered out of an SMS message.

In an example, the data processing layer is used to extract POI texts, and extract, from the first user data by using an NLP technology, a plurality of POI texts related to POIs.

The data processing layer is further used to separately store, based on a type of a POI corresponding to each POI text, the plurality of POI texts into index libraries of different POI types in the index layer.

(2) For the SDK log data, for example, the data processing layer is used to resort to a log analysis means to obtain, based on click operations on POIs in the SDK log data, a quantity of clicks on each POI, and use the quantity of clicks on each POI as inputs of a ranking model in the ranking module 314, to update the ranking model.

For a process of processing the first user data and the SDK log data by the data processing layer, refer to related descriptions about the foregoing method.

Index layer: The index layer includes an index library corresponding to each type of POIs, and the index library for each type of POIs stores a POI text corresponding to the type. As shown in FIG. 10, the index layer includes index libraries whose types are "hotel", "scenic spot", and "restaurant".

2. Address Extension Module 312

The address extension module 312 is configured to perform, based on the first user data, address extension on a first search text entered by a user, to obtain a second search text and ultimately implement user-oriented personalized recall. For a process in which the address extension module 312 performs the address extension to obtain the second search text, refer to related descriptions about the step S220 in the method 200.

3. TEE Module 313

The TEE module 313 is configured to encrypt the second search text or encrypt both the second search text and the first search text in the TEE, and send the encrypted second search text or send the encrypted second search text and the encrypted first search text to the TEE module 321 of the server 320.

4. Ranking Module 314

A purpose of the ranking module 314 is to rank POI search results, where a ranking model is configured in the ranking module 314. The ranking module 314 is configured to perform feature extraction on a plurality of POI search results fed back by the server 320, to obtain at least one feature value including a quantity of historical clicks on a POI corresponding to each POI search result, use the at least one feature value as inputs of the ranking model, re-rank the plurality of POI search results by using the ranking model, and return a recommended rank meeting a search intention of the user.

For a process in which the ranking module 314 ranks the plurality of POI search results to determine the recommended rank, refer to related descriptions about steps S250 and S260 in the method 200.

The server 320 may include a TEE module 321 and an operating system (OS) module 322. The TEE module 321 and the OS module 322 are running environments that coexist on the server. The TEE module 321 provides security assurance for the OS module 322. The following describes interaction between the TEE module 321 of the server 320 and the OS module 322 of the server 320 with reference to FIG. 11.

Figure 11:
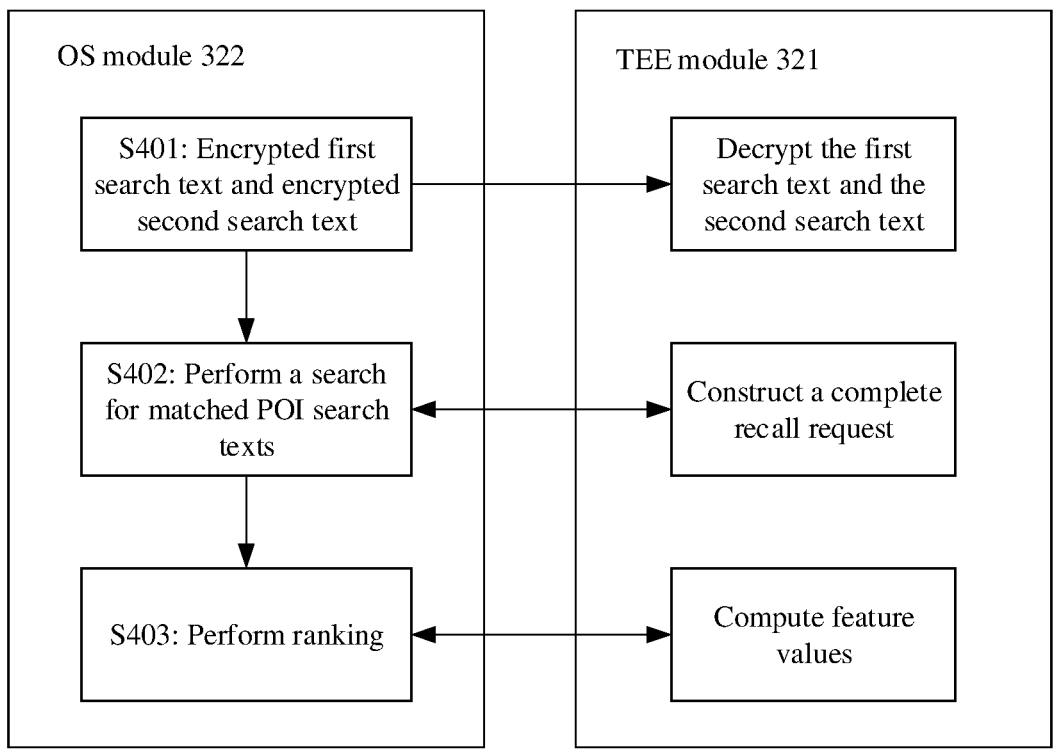
FIG. 11 is a schematic diagram of exemplary interaction between an OS module and a TEE module on a server side according to an embodiment of this application.

FIG. 11 is a schematic diagram of example interaction between an OS module 322 and a TEE module 321 on a server side according to an embodiment of this application. In this process, description is provided by using an example in which a search request includes a first search text and a second search text.

It needs to be understood that, because an objective of the TEE module 321 is to protect user privacy in consideration of security, all processes in which the first search text and the second search text need to be used are performed in the TEE module 321; and a process in which a search, based on the first search text and the second search text, for a matched POI search result in a database is performed in the OS module 322.

In S401, the OS module 322 receives an encrypted first search text and an encrypted second search text; and the first search text and the second search text are decrypted in the TEE module 321, and are stored into the TEE module 321.

In S402, the OS module 322 sends a recall template with default values to the TEE module 321; the TEE module 321 enters the first search text and the second search text into the default values of the recall template to construct a complete recall request, outputs the recall request, and sends the recall request to the OS module 322; and the OS module 322 outputs, based on the recall request, a plurality of POI search results matching the recall request. It needs to be understood that, the recall template may also be understood as a request template with the default values, and the recall request is used to make a request for search results from the database.

In S403, the OS module 322 sends the plurality of POI search results to the TEE module 321; the TEE module 321 computes, based on the first search text, the second search text, and the plurality of POI search results, a feature value of a POI corresponding to each POI search result, and sends the feature value of the POI corresponding to the POI search result to the OS module 322; and the OS module 322 completes ranking of the plurality of POI search results, and outputs the plurality of POI search results in a server rank.

Figure 12:
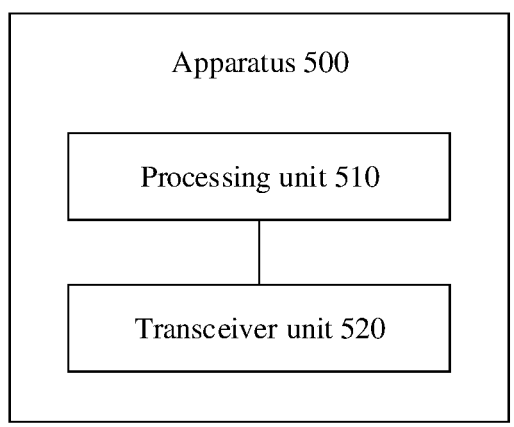
FIG. 12 is a schematic block diagram of an exemplary apparatus for searching for a POI according to an embodiment of this application.
Figure 13:
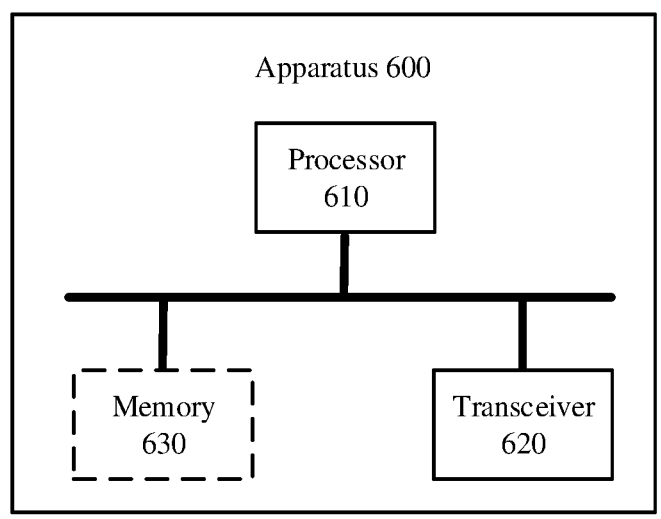
FIG. 13 is a schematic diagram of a structure of an exemplary apparatus for searching for a POI according to an embodiment of this application.

The following describes an apparatus for searching for a point of information according to an embodiment of this application with reference to FIG. 12 and FIG. 13.

FIG. 12 shows an example apparatus 500 for searching for a point of information according to an embodiment of this application. The apparatus 500 may be the foregoing client, or may be a chip in the client. The apparatus 500 includes a processing unit 510 and a transceiver unit 520.

In a possible implementation, the apparatus 500 is configured to perform various procedures and steps corresponding to the client in the method 200;

the processing unit 510 is configured to obtain a first search text entered by a user;

the processing unit 510 is further configured to determine, based on the first search text and first user data of the apparatus, a second search text, where the first user data includes an address set, the second search text includes the first search text and first address information, the first address information indicates at least one address, a point of information (POI) corresponding to each address matches the first search text, and each address is related to an address in the address set;

the transceiver unit 520 is configured to send a search request to a server, where the search request includes the second search text; and the transceiver unit 520 is further configured to receive a plurality of POI search results sent by the server in response to the search request, where the plurality of POI search results include M POI search results matching the second search text, and M is an integer greater than or equal to 1.

The processing unit 510 may be configured to perform procedures and steps in steps S210 and S220 in the method 200, and the transceiver unit 520 may be configured to perform procedures and steps corresponding to the client in steps S230 and S240 in the method 200.

It needs to be understood that, a specific process in which each unit performs a corresponding step in the foregoing method is already described in detail in the foregoing method embodiments.

It needs to be understood that the apparatus 500 herein is embodied in a form of functional units. The term "unit" herein may refer to an application-specific integrated circuit (ASIC), an electronic circuit, a processor (for example, a shared processor, a dedicated processor, or a processor group) configured to execute one or more software or firmware programs, a memory, a merged logic circuit, and/or another appropriate component that supports the described functions.

The apparatus 500 in the foregoing solution has functions to implement corresponding steps performed by the client in the foregoing method. The functions may be implemented by hardware, or may be implemented by hardware by executing corresponding software. The hardware or the software includes one or more modules corresponding to the functions. For example, the transceiver unit may be replaced with a transmitter and a receiver, and another unit such as the processing unit may be replaced with a processor, to separately perform a sending operation, a receiving operation, and a related processing operation in the method embodiments. In addition, the communication unit in the apparatus 500 may alternatively include a sending unit and a receiving unit. For performing a receiving-related operation, functions of the communication unit may be understood as a receiving operation performed by the receiving unit; and for performing a sending-related operation, functions of the communication unit may be understood as a sending operation performed by the sending unit.

In this embodiment, the apparatus in FIG. 12 may be alternatively a chip or a chip system, for example, a system on chip (SoC). Correspondingly, the transceiver unit may be a transceiver circuit of the chip. This is not limited herein.

FIG. 13 shows another example apparatus 600 for searching for a point of information according to an embodiment of this application. It needs to be understood that, the apparatus 600 may be specifically the client in the foregoing embodiments, and may be configured to perform steps and/or procedures corresponding to the client in the foregoing method embodiments.

The apparatus 600 includes a processor 610, a transceiver 620, and a memory 630. The processor 610, the transceiver 620, and the memory 630 communicate with each other by using an internal connection path. The processor 610 may implement functions of the processing unit 510 in possible implementations of the apparatus 500. The transceiver 620 may implement functions of the transceiver unit 520 in possible implementations of the apparatus 500. The memory 630 is configured to store instructions, and the processor 610 is configured to execute the instructions stored in the memory 630. In other words, the processor 610 may invoke the stored instructions to implement functions of the processor 610 in the apparatus 600, to control the transceiver 620 to send a signal and/or receive a signal.

Optionally, the memory 630 may include a read-only memory and a random access memory, and provides the instructions and data for the processor. A part of the memory may further include a nonvolatile random access memory. For example, the memory may further store information about a device type. The processor 610 may be configured to execute the instructions stored in the memory. In addition, when the processor 610 executes the instructions stored in the memory, the processor 610 is configured to perform steps and/or procedures corresponding to the client in the foregoing method embodiments.

In a possible implementation, the apparatus 600 is configured to perform procedures and steps corresponding to the client in the method 200;

the processor 610 is configured to obtain a first search text entered by a user;

the processor 610 is further configured to determine, based on the first search text and first user data of the apparatus, a second search text, where the first user data includes an address set, the second search text includes the first search text and first address information, the first address information indicates at least one address, a point of information (POI) corresponding to each address matches the first search text, and each address is related to an address in the address set;

the transceiver 620 is configured to send a search request to a server, where the search request includes the second search text; and the transceiver 620 is further configured to receive a plurality of POI search results sent by the server in response to the search request, where the plurality of POI search results include M POI search results matching the second search text, and M is an integer greater than or equal to 1.

It needs to be understood that, a specific process in which each component performs a corresponding step in the foregoing method is already described in detail in the foregoing method embodiments.

It needs to be understood that in this embodiment, the processor in the foregoing apparatus may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, or a discrete hardware component, or the like. The general-purpose processor may be a microprocessor, or the processor may be any conventional processor, or the like.

In an implementation process, the steps in the foregoing method may be completed by an integrated logic circuit in a form of hardware or instructions in a form of software in the processor. The steps of the method disclosed with reference to embodiments of this application may be directly implemented by a hardware processor, or may be implemented by using a combination of hardware in a processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor executes the instructions in the memory, and completes the steps of the foregoing method in combination with the hardware of the processor.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It needs to be noted that the terms "first" and "second" are merely intended for a purpose of description, and shall not be understood as an indication or implication of relative importance or implicit indication of a quantity of indicated technical features. A feature limited by "first" and "second" may explicitly or implicitly include one or more features.

In embodiments of this application, "at least one" means one or more, and "a plurality of" means two or more. "At least some members" means some or all members. The term "and/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects.

A person skilled in the art can clearly understand that, for the purpose of convenient and brief description, for detailed working processes of the foregoing systems, apparatuses, and units, refer to corresponding processes in the foregoing method embodiments.

In the several embodiments provided in this application, it needs to be understood that the disclosed systems, apparatuses, and methods may be implemented in other manners. For example, the described apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. Indirect couplings or communication connections between the apparatuses or units may be implemented in electronic, mechanical, or other forms.

The units described as separate parts may or may not be physically separate, and parts displayed as units may or may not be physical units, and may be located at one position, or may be distributed on a plurality of network units. Some or all of the units may be selected depending on actual requirements to achieve the objectives of the solutions in the embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely non-limiting examples of implementations and are not intended to limit the protection scope, which is intended to cover any variation or replacement readily determined by a person of ordinary skill in the art. Therefore, the claims shall define the protection scope.

What is claimed is:

1. A method of searching for a point of information, comprising:
    obtaining a first search text entered by a user;
    determining, based on the first search text and first user data stored in a client, a second search text, wherein the first user data comprises an address set, the second search text comprises the first search text and first address information, the first address information indicates at least one address, a point of information (POI) corresponding to each of the at least one address matches the first search text, and each of the at least one address is related to an address in the address set;
    sending a search request to a server, wherein the search request comprises the second search text; and
    receiving a plurality of POI search results sent by the server in response to the search request,
    wherein the method further comprises;
    for each POI search result in the plurality of POI search results; performing feature extraction on the POI search result, and determining at least one feature value corresponding to the POI search result; and
    ranking the plurality of POI search results based on the at least one feature value corresponding to each POI search result in the plurality of POI search results, to determine a recommended rank,
    wherein the ranking of the plurality of POI search results based on the at least one feature value corresponding to each POI search result in the plurality of POI search results, to determine the recommended rank comprises:
    ranking the plurality of POI search results based on the at least one feature value corresponding to each POI search result in the plurality of POI search results, to determine a client rank; and
    determining, based on the client rank and a server rank that is obtained by the server by ranking the plurality of POI search results, the recommended rank, wherein a first POI search result in the recommended rank is a first POI search result in the client rank, and a rank of POI search results in the recommended rank other than the first POI search result in the recommended rank is a rank of POI search results in the server rank other than the first POI search result in the recommended rank.

2. The method according to claim 1, wherein the determining, based on the first search text and first user data, a second search text comprises:
    filtering, based on the first search text, the first user data to obtain a candidate POI text set including one or more candidate POI texts, wherein each candidate POI text in the candidate POI text set matches the first search text and comprises address information, and an address indicated by the address information in each candidate POI text in the candidate POI text set is an address in the address set; and determining, based on the first search text and the candidate POI text set, the second search text, wherein each address indicated by the first address information is related to an address indicated by the address information in the candidate POI text set.

3. The method according to claim 2, wherein the candidate POI text set comprises a plurality of candidate POI texts; and the determining, based on the first search text and the candidate POI text set, the second search text comprises:

filtering, based on an effective time of a POI corresponding to each candidate POI text in the candidate POI text set and/or popularity of the POI corresponding to each candidate POI text in the candidate POI text set, the candidate POI text set to obtain an ultimate candidate POI text; and determining, based on the first search text and the ultimate candidate POI text, the second search text, wherein each address indicated by the first address information is related to an address indicated by address information in the ultimate candidate POI text.

4. The method according to claim 1, wherein the at least one feature value corresponding to the POI search result comprises a quantity of historical clicks on a POI corresponding to the POI search result, the quantity of historical clicks is obtained based on software development kit (SDK) log data, and the SDK log data records a click operation performed by the user on the POI on each application (APP).

5. The method according to claim 4, wherein the at least one feature value corresponding to the POI search result further comprises at least one of:

a feature value used to represent relevance between the second search text and the POI corresponding to the POI search result, or a distance between an address at which the user is currently located and the POI corresponding to the POI search result, or a feature value of a type of the POI corresponding to the POI search result.

6. The method according to claim 4, wherein the client rank is obtained based on a learning-to-rank (LTR) model; and the method further comprises:

updating the SDK log data based on a click operation performed by the user on at least one POI search result in the plurality of POI search results, to update the LTR model.

7. The method according to claim 1, wherein the search request further comprises the first search text; and the plurality of POI search results comprise N POI search results matching the first search text other than M POI search results matching the second search text, wherein M and N each are an integer greater than or equal to 1.

8. The method according to claim 1, wherein the second search text is an encrypted search text.

9. An apparatus, comprising:

at least one processor; and a memory, configured to store computer instructions that, when executed by the at least one processor, cause the apparatus to perform operations of searching for a point of information, comprising:

obtaining a first search text entered by a user;

determining, based on the first search text and first user data, a second search text, wherein the first user data comprises an address set, the second search text comprises the first search text and first address information, the first address information indicates at least one address, a point of information (POI) corresponding to each of the at least one address matches the first search text, and each of the at least one address is related to an address in the address set;

sending a search request to a server, wherein the search request comprises the second search text; and receiving a plurality of POI search results sent by the server in response to the search request, wherein the operations of searching for the point of information further comprise:

for each POI search result in the plurality of POI search results: performing feature extraction on the POI search result, and determining at least one feature value corresponding to the POI search result; and ranking the plurality of POI search results based on the at least one feature value corresponding to each POI search result in the plurality of POI search results, to determine a recommended rank, wherein the ranking of the plurality of POI search results based on the at least one feature value corresponding to each POI search result in the plurality of POI search results, to determine the recommended rank comprises:

ranking the plurality of POI search results based on the at least one feature value corresponding to each POI search result in the plurality of POI search results, to determine a client rank; and determining based on the client rank and a server rank that is obtained by the server by ranking the plurality of POI search results, the recommended rank, wherein a first POI search result in the recommended rank is a first POI search result in the client rank, and a rank of POI search results in the recommended rank other than the first POI search result in the recommended rank is a rank of POI search results in the server rank other than the first POI search result in the recommended rank.

10. The apparatus according to claim 9, wherein the determining, based on the first search text and first user data, a second search text comprises:

filtering, based on the first search text, the first user data to obtain a candidate POI text set including one or more candidate POI texts, wherein each candidate POI text in the candidate POI text set matches the first search text and comprises address information, and an address indicated by the address information in each candidate POI text in the candidate POI text set is an address in the address set; and determining, based on the first search text and the candidate POI text set, the second search text, wherein each address indicated by the first address information is related to an address indicated by the address information in the candidate POI text set.

11. The apparatus according to claim 10, wherein the candidate POI text set comprises a plurality of candidate POI texts; and the determining, based on the first search text and the candidate POI text set, the second search text comprises:

filtering, based on an effective time of a POI corresponding to each candidate POI text in the candidate POI text set and/or popularity of the POI corresponding to each candidate POI text in the candidate POI text set, the candidate POI text set to obtain an ultimate candidate POI text; and determining, based on the first search text and the ultimate candidate POI text, the second search text, wherein each address indicated by the first address information is related to an address indicated by address information in the ultimate candidate POI text.

12. The apparatus according to claim 9, wherein the at least one feature value corresponding to the POI search result comprises a quantity of historical clicks on a POI corresponding to the POI search result, the quantity of historical clicks is obtained based on software development kit (SDK) log data, and the SDK log data records a click operation performed by the user on the POI on each application (APP).

13. The apparatus according to claim 12, wherein the at least one feature value corresponding to the POI search result further comprises at least one of the following:
 a feature value used to represent relevance between the second search text and the POI corresponding to the POI search result, or
 a distance between an address at which the user is currently located and the POI corresponding to the POI search result, or
 a feature value of a type of the POI corresponding to the POI search result.

14. The apparatus according to claim 12, wherein the client rank is obtained based on a learning-to-rank (LTR) model; and the operations further comprise:
 updating the SDK log data based on a click operation performed by the user on at least one POI search result in the plurality of POI search results, to update the LTR model.

15. A non-transitory, computer-readable storage medium, configured to store computer instructions that, when executed by at least one processor, cause the at least one processor to perform operations of searching for a point of information, comprising:
 obtaining a first search text entered by a user;
 determining, based on the first search text and first user data, a second search text, wherein the first user data comprises an address set, the second search text comprises the first search text and first address information, the first address information indicates at least one address, a point of information (POI) corresponding to each of the at least one address matches the first search text, and each of the at least one address is related to an address in the address set;
 sending a search request to a server, wherein the search request comprises the second search text; and
 receiving a plurality of POI search results sent by the server in response to the search request,
 wherein the operations of searching for the point of information further comprise:
 for each POI search result the plurality of POI search results: performing feature extraction on the POI search result, and determining at least one feature value corresponding to the POI search result; and
 ranking the plurality of POI search results based on the at least one feature value corresponding to each POI search result in the plurality of POI search results, to determine a recommended rank,
 wherein the ranking of the plurality of POI search results based on the at least one feature value corresponding to each POI search result in the plurality of POI search results, to determine the recommended rank comprises:
 ranking the plurality of POI search results based on the at least one feature value corresponding to each POI search result in the plurality of POI search results, to determine a client rank; and
 determining, based on the client rank and a rank that is obtained by the server by ranking the plurality of POI search results, the recommended rank, wherein a first POI search result in the recommended rank is a first POI search result in the client rank, and a rank of POI search results in the recommended rank other than the first POI search result in the recommended rank is a rank of POI search results in the server rank other than the first POI search result in the recommended rank.

16. The non-transitory, computer-readable storage medium according to claim 15, wherein the determining, based on the first search text and first user data, a second search text comprises:
 filtering, based on the first search text, the first user data to obtain a candidate POI text set including one or more candidate POI texts, wherein each candidate POI text in the candidate POI text set matches the first search text and comprises address information, and an address indicated by the address information in each candidate POI text in the candidate POI text set is an address in the address set; and
 determining, based on the first search text and the candidate POI text set, the second search text, wherein each address indicated by the first address information is related to an address indicated by the address information in the candidate POI text set.

17. The non-transitory, computer-readable storage medium according to claim 16, wherein the candidate POI text set comprises a plurality of candidate POI texts; and the determining, based on the first search text and the candidate POI text set, the second search text comprises:
 filtering, based on an effective time of a POI corresponding to each candidate POI text in the candidate POI text set and/or popularity of the POI corresponding to each candidate POI text in the candidate POI text set, the candidate POI text set to obtain an ultimate candidate POI text; and
 determining, based on the first search text and the ultimate candidate POI text, the second search text, wherein each address indicated by the first address information is related to an address indicated by address information in the ultimate candidate POI text.

18. The non-transitory, computer-readable storage medium according to claim 15, wherein
 the at least one feature value corresponding to the POI search result comprises a quantity of historical clicks on a POI corresponding to the POI search result, the quantity of historical clicks is obtained based on software development kit (SDK) log data, and the SDK log data records a click operation performed by the user on the POI on each application (APP).

* * * * *

UNITED STATES PATENT AND TRADEMARK OFFICE
CERTIFICATE OF CORRECTION

PATENT NO. : 12,367,227 B2  
APPLICATION NO. : 18/541155  
DATED : July 22, 2025  
INVENTOR(S) : Wenjie Liu Page 1 of 1

It is certified that error appears in the above-identified patent and that said Letters Patent is hereby corrected as shown below:

In the Claims

Column 37, Claim 15, Line 50, change "result the plurality" to -- result in the plurality --; and Column 38, Claim 15, Line 7, change "and a rank" to -- and a server rank --.

Signed and Sealed this  
Nineteenth Day of August, 2025

Coke Morgan Stewart  
*Acting Director of the United States Patent and Trademark Office*